(12) United States Patent
Zha et al.

(10) Patent No.: US 11,824,657 B2
(45) Date of Patent: Nov. 21, 2023

(54) FRAME PROCESSING METHOD AND APPARATUS

(71) Applicant: HUAWEI TECHNOLOGIES CO., LTD., Guangdong (CN)

(72) Inventors: Min Zha, Shenzhen (CN); Qichang Chen, Shenzhen (CN); Dongdong He, Shenzhen (CN); Lehong Niu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 17/680,525

(22) Filed: Feb. 25, 2022

(65) Prior Publication Data
US 2022/0182182 A1    Jun. 9, 2022

Related U.S. Application Data

(63) Continuation of application No. PCT/CN2020/110595, filed on Aug. 21, 2020.

(30) Foreign Application Priority Data

Aug. 29, 2019 (CN) .......................... 201910820657.5

(51) Int. Cl.
H04L 1/00 (2006.01)
H04L 1/1812 (2023.01)
H04L 1/22 (2006.01)

(52) U.S. Cl.
CPC .......... *H04L 1/0083* (2013.01); *H04L 1/0007* (2013.01); *H04L 1/1816* (2013.01); *H04L 1/22* (2013.01)

(58) Field of Classification Search
CPC ... H04L 1/0083; H04L 1/0007; H04L 1/1816; H04L 1/22; H04L 2001/0097; H04L 1/08;
(Continued)

(56) References Cited

U.S. PATENT DOCUMENTS

2009/0225676 A1    9/2009  Kisela et al.
2013/0114606 A1*   5/2013  Schrum, Jr. ............. H04L 45/22
                                                      370/389
(Continued)

FOREIGN PATENT DOCUMENTS

CN    108173755 A    6/2018
CN    108551425 A    9/2018
(Continued)

OTHER PUBLICATIONS

Cupek Rafal et al, Feasibility Study of the Application of OPC UA Protocol for the Vehicle-to-Vehicle Conanunication, Sep. 7, 2017 (Sep. 7, 2017), SAT 2015 18th International Conference, Austin, TX, USA, Sep. 24-27, 2015; [Lecture Notes in Computer Science; Lect. Notes Computer], Springer, Berlin, Heidelberg, pp. 282-291, XP047475345.
(Continued)

*Primary Examiner* — Yaotang Wang

(57) ABSTRACT

A frame processing method and apparatus are provided, to implement selective receiving in a redundant transmission scenario. According to a method, a destination device receives a first Ethernet frame from a first intermediate node through a first interface, where the first Ethernet frame includes a first time point, and the first time point is a processing time point of the first Ethernet frame on the first intermediate node. The destination device receives a second Ethernet frame from a second intermediate node through a second interface, where the second Ethernet frame includes a second time point, and the second time point is a processing time point of the second Ethernet frame on the second intermediate node. The destination device determines, based on the first time point and the second time point, whether the second Ethernet frame is a duplicate frame of the first Ethernet frame.

20 Claims, 21 Drawing Sheets

(58) Field of Classification Search
CPC ..... H04L 69/08; H04L 43/106; H04L 47/283; H04L 47/35; H04L 65/765; H04L 12/40195; H04L 43/0852; H04L 65/1045; H04L 65/80
See application file for complete search history.

(56) References Cited

U.S. PATENT DOCUMENTS

| | | | |
|---|---|---|---|
| 2013/0132789 A1 | 5/2013 | Watford et al. | |
| 2017/0214606 A1 | 7/2017 | Park et al. | |
| 2017/0289878 A1* | 10/2017 | Ou | H04L 1/1854 |
| 2019/0387197 A1* | 12/2019 | Balcioglu | H04N 21/41422 |
| 2020/0329102 A1* | 10/2020 | Wang | H04L 43/106 |

FOREIGN PATENT DOCUMENTS

| | | |
|---|---|---|
| CN | 108600097 A | 9/2018 |
| EP | 1768328 A1 | 3/2007 |
| WO | 2013067377 A2 | 5/2013 |
| WO | WO-2017061922 A1 * | 4/2017 |

OTHER PUBLICATIONS

Extended European Search Report issued in EP20856635.6, dated Sep. 15, 2022, 12 pages.
IEEE Std 802.1CB-2017:"IEEE Standard for Local and metropolitan area networks, Frame Replication and Elimination for Reliability", total 102 pages.
"IEEE Standard for Ethernet," in IEEE Std 802.3-2018 (Revision of IEEE Std 802.3-2015), Sections 1-8, Aug. 31, 2018, doi: 10.1109/IEEESTD.2018.8457469, Total 4043 Pages.
"IEEE Standard for Local and Metropolitan Area Network—Bridges and Bridged Networks," in IEEE Std 802.1Q-2018 (Revision of IEEE Std 802.1Q-2014), vol. No., pp. 1-1993, Jul. 6, 2018, doi: 10.1109/IEEESTD.2018.8403927.
IEC 62439-3(Edition 2.0 Jul. 2012), Industrial communication networks High availability automation networks Part 3: Parallel Redundancy Protocol (PRP) and High-availability Seamless Redundancy (HSR), Total 182 Pages.
International Search Report and Written Opinion issued in PCT/CN2020/110595, dated Nov. 25, 2020, 10 pages.

* cited by examiner

| Preamble + start of frame delimiter (Preamble + Start of frame delimiter) | MAC destination (MAC destination) | MAC source (MAC source) | 802.1Q tag (802.1Q tag) (optional (optional)) | Ethertype (Ethernet II) or length (IEEE 802.3) (Ethertype (Ethernet II) or length (IEEE 802.3)) | Reserved (Reserved) | Sequence number (sequence number) | Ethertype (Ethernet II) or length (IEEE 802.3) (Ethertype (Ethernet II) or length (IEEE 802.3)) | Payload (Payload) | FCS frame check sequence (FCS-Frame check sequence) (32-bit CRC) |
|---|---|---|---|---|---|---|---|---|---|
| 8 octets (8 octets) | 6 octets (6 octets) | 6 octets (6 octets) | 4 octets (4 octets) | 2 octets (2 octets) | 2 octets (2 octets) | 2 octets (2 octets) | 2 octets (2 octets) | 46 to 1500 octets (46-1500 octets) | 4 octets (4 octets) |

FIG. 4a

| Preamble + start of frame delimiter (Preamble + Start of frame delimiter) | MAC destination (MAC destination) | MAC source (MAC source) | 802.1Q tag (802.1Q tag) (optional (optional)) | Ethertype (Ethernet II) or length (IEEE 802.3) (Ethertype (Ethernet II) or length (IEEE 802.3)) | Reserved (Reserved) | Processing time point | Ethertype (Ethernet II) or length (IEEE 802.3) (Ethertype (Ethernet II) or length (IEEE 802.3)) | Payload (Payload) | FCS frame check sequence (FCS-Frame check sequence) (32-bit CRC) |
|---|---|---|---|---|---|---|---|---|---|
| 8 octets (8 octets) | 6 octets (6 octets) | 6 octets (6 octets) | 4 octets (4 octets) | 2 octets (2 octets) | 2 octets (2 octets) | 2 octets (2 octets) | 2 octets (2 octets) | 46 to 1500 octets (46-1500 octets) | 4 octets (4 octets) |

FIG. 4b

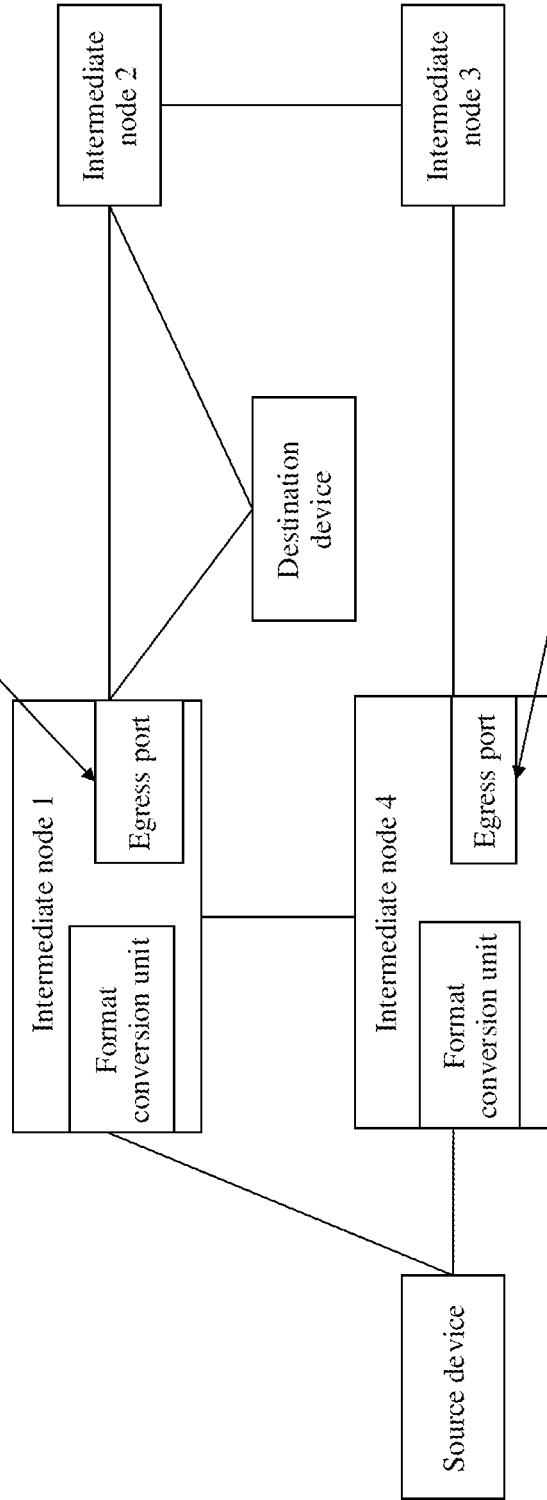

| Preamble + start of frame delimiter (Preamble + Start of frame delimiter) | MAC destination (MAC destination) | MAC source (MAC source) | 802.1Q tag (802.1Q tag) (optional (optional)) | Ethertype (Ethernet II) or length (IEEE 802.3) (Ethertype (Ethernet II) or length (IEEE 802.3)) | Reserved (Reserved) | Timestamp (timestamp) | Ethertype (Ethernet II) or length (IEEE 802.3) (Ethertype (Ethernet II) or length (IEEE 802.3)) | Payload (Payload) | FCS frame check sequence (FCS-Frame check sequence (32-bit CRC) |
|---|---|---|---|---|---|---|---|---|---|
| 8 octets (8 octets) | 6 octets (6 octets) | 6 octets (6 octets) | 4 octets (4 octets) | 2 octets (2 octets) | 2 octets (2 octets) | 2 octets (2 octets) | 2 octets (2 octets) | 46 to 1500 octets (46-1500 octets) | 4 octets (4 octets) |

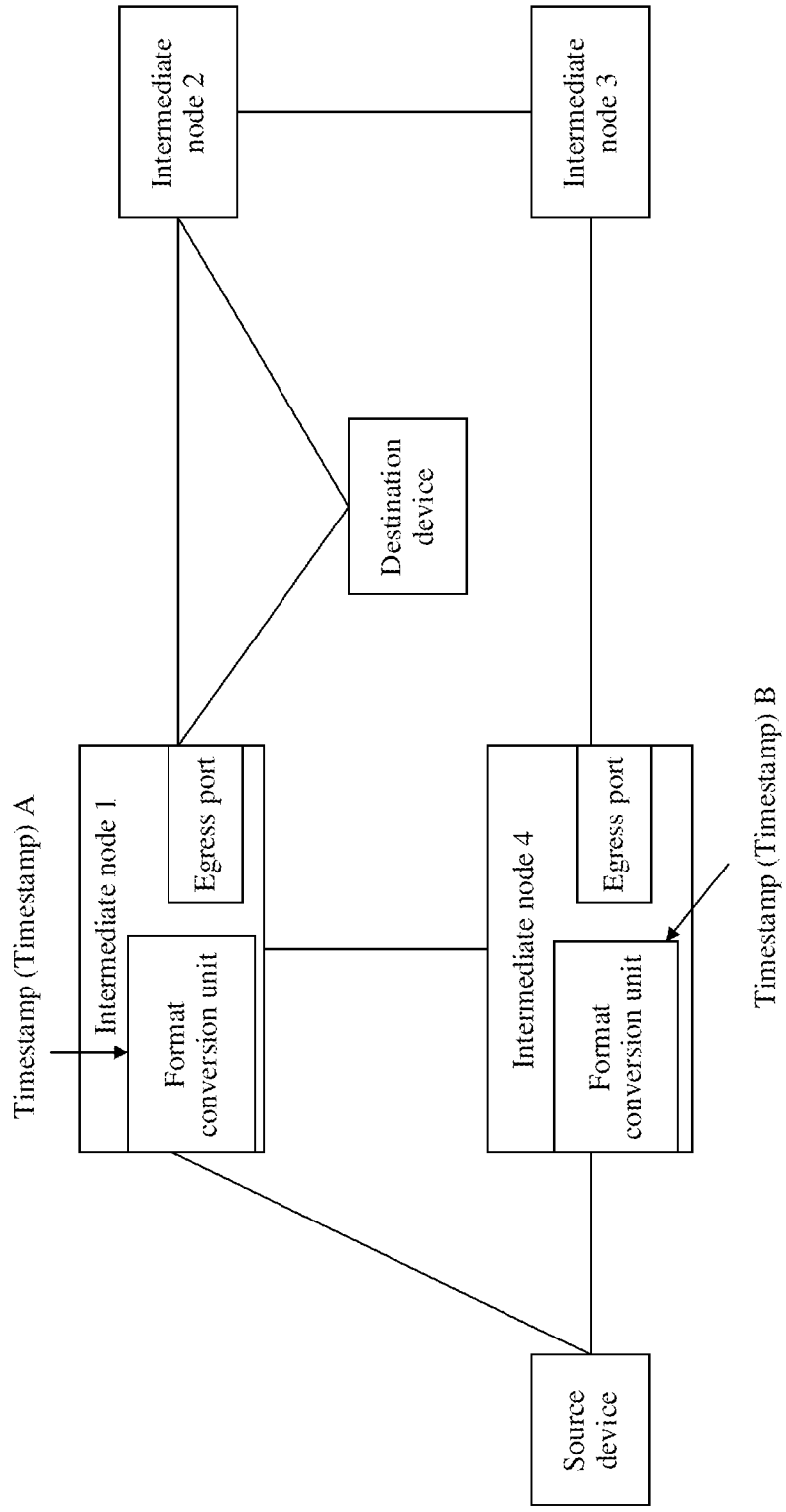

| Preamble + start of frame delimiter (Preamble + Start of frame delimiter) | MAC destination (MAC destination) | MAC source (MAC source) | 802.1Q tag (802.1Q tag (optional)) | Ethertype (Ethernet II) or length (IEEE 802.3) (Ethertype (Ethernet II) or length (IEEE 802.3)) | Reserved (Reserved) | Timestamp (timestamp) | Ethertype (Ethernet II) or length (IEEE 802.3) (Ethertype (Ethernet II) or length (IEEE 802.3)) | Payload (Payload) | FCS frame check sequence (FCS-Frame check sequence (32-bit CRC)) |
|---|---|---|---|---|---|---|---|---|---|
| 8 octets (8 octets) | 6 octets (6 octets) | 6 octets (6 octets) | 4 octets (4 octets) | 2 octets (2 octets) | 2 octets (2 octets) | 2 octets (2 octets) | 2 octets (2 octets) | 46 to 1500 octets (46-1500 octets) | 4 octets (4 octets) |

CONT. FROM FIG. 5b-2 

FIG. 5b-3

| Preamble + start of frame delimiter (Preamble + Start of frame delimiter) | MAC destination (MAC destination) | MAC source (MAC source) | 802.1Q tag (802.1Q tag) (optional) (optional)) | Ethertype (Ethernet II) or length (IEEE 802.3) (Ethertype (Ethernet II) or length (IEEE 802.3)) | Reserved (Reserved) | Continuity count (continuity count) | Timestamp (timestamp) | Ethertype (Ethernet II) or length (IEEE 802.3) (Ethertype (Ethernet II) or length (IEEE 802.3)) | Payload (Payload) | FCS frame check sequence (FCS-Frame check sequence) (32-bit CRC) |
|---|---|---|---|---|---|---|---|---|---|---|
| 8 octets (8 octets) | 6 octets (6 octets) | 6 octets (6 octets) | 4 octets (4 octets) | 2 octets (2 octets) | 4 bits (4 bits) | 12 bits (12 bits) | 2 octets (2 octets) | 2 octets (2 octets) | 46 to 1500 octets (46-1500 octets) | 4 octets (4 octets) |

FIG. 7

| Preamble + start of frame delimiter (Preamble + Start of frame delimiter) | MAC destination (MAC destination) | MAC source (MAC source) | 802.1Q tag (802.1Q tag) (optional (optional)) | Ethertype (Ethernet II) or length (IEEE 802.3) (Ethertype (Ethernet II) or length (IEEE 802.3)) | Reserved (Reserved) | Continuity count (continuity count) | Timestamp (timestamp) | Ethertype (Ethernet II) or length (IEEE 802.3) (Ethertype (Ethernet II) or length (IEEE 802.3)) | Payload (Payload) | FCS frame check sequence (FCS-Frame check sequence) (32-bit CRC) |
|---|---|---|---|---|---|---|---|---|---|---|
| 8 octets (8 octets) | 6 octets (6 octets) | 6 octets (6 octets) | 4 octets (4 octets) | 2 octets (2 octets) | 4 bits (4 bits) | 12 bits (12 bits) | 2 octets (2 octets) | 2 octets (2 octets) | 46 to 1500 octets (46-1500 octets) | 4 octets (4 octets) |

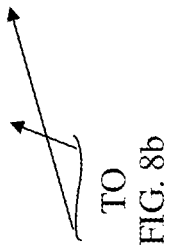

| Preamble + start of frame delimiter (Preamble + Start of frame delimiter) | MAC destination (MAC destination) | MAC source (MAC source) | 802.1Q tag (802.1Q tag) (optional) (optional)) | Ethertype (Ethernet II) or length (IEEE 802.3) (Ethertype (Ethernet II) or length (IEEE 802.3)) | Reserved (Reserved) | Continuity count (continuity count) | Timestamp (timestamp) | Ethertype (Ethernet II) or length (IEEE 802.3) (Ethertype (Ethernet II) or length (IEEE 802.3)) | Payload (Payload) | FCS frame check sequence (FCS-Frame check sequence (32-bit CRC)) |
|---|---|---|---|---|---|---|---|---|---|---|
| 8 octets (8 octets) | 6 octets (6 octets) | 6 octets (6 octets) | 4 octets (4 octets) | 2 octets (2 octets) | 4 bits (4 bits) | 12 bits (12 bits) | 2 octets (2 octets) | 2 octets (2 octets) | 46 to 1500 octets (46-1500 octets) | 4 octets (4 octets) |

CONT. FROM FIG. 8b

FIG. 8c

| Preamble + start of frame delimiter (Preamble + Start of frame delimiter) | MAC destination (MAC destination) | MAC source (MAC source) | 802.1Q tag (802.1Q tag (optional)) | Ethertype (Ethernet II) or length (IEEE 802.3) (Ethertype (Ethernet II) or length (IEEE 802.3)) | Reserved (Reserved) | Video frame time (video frame time) | Timestamp (timestamp) | Ethertype (Ethernet II) or length (IEEE 802.3) (Ethertype (Ethernet II) or length (IEEE 802.3)) | Payload (Payload) | FCS frame check sequence (FCS-Frame check sequence (32-bit CRC)) |
|---|---|---|---|---|---|---|---|---|---|---|
| 8 octets (8 octets) | 6 octets (6 octets) | 6 octets (6 octets) | 4 octets (4 octets) | 2 octets (2 octets) | 4 bits (4 bits) | 12 bits (12 bits) | 2 octets (2 octets) | 2 octets (2 octets) | 46 to 1500 octets (46-1500 octets) | 4 octets (4 octets) |

FIG. 9

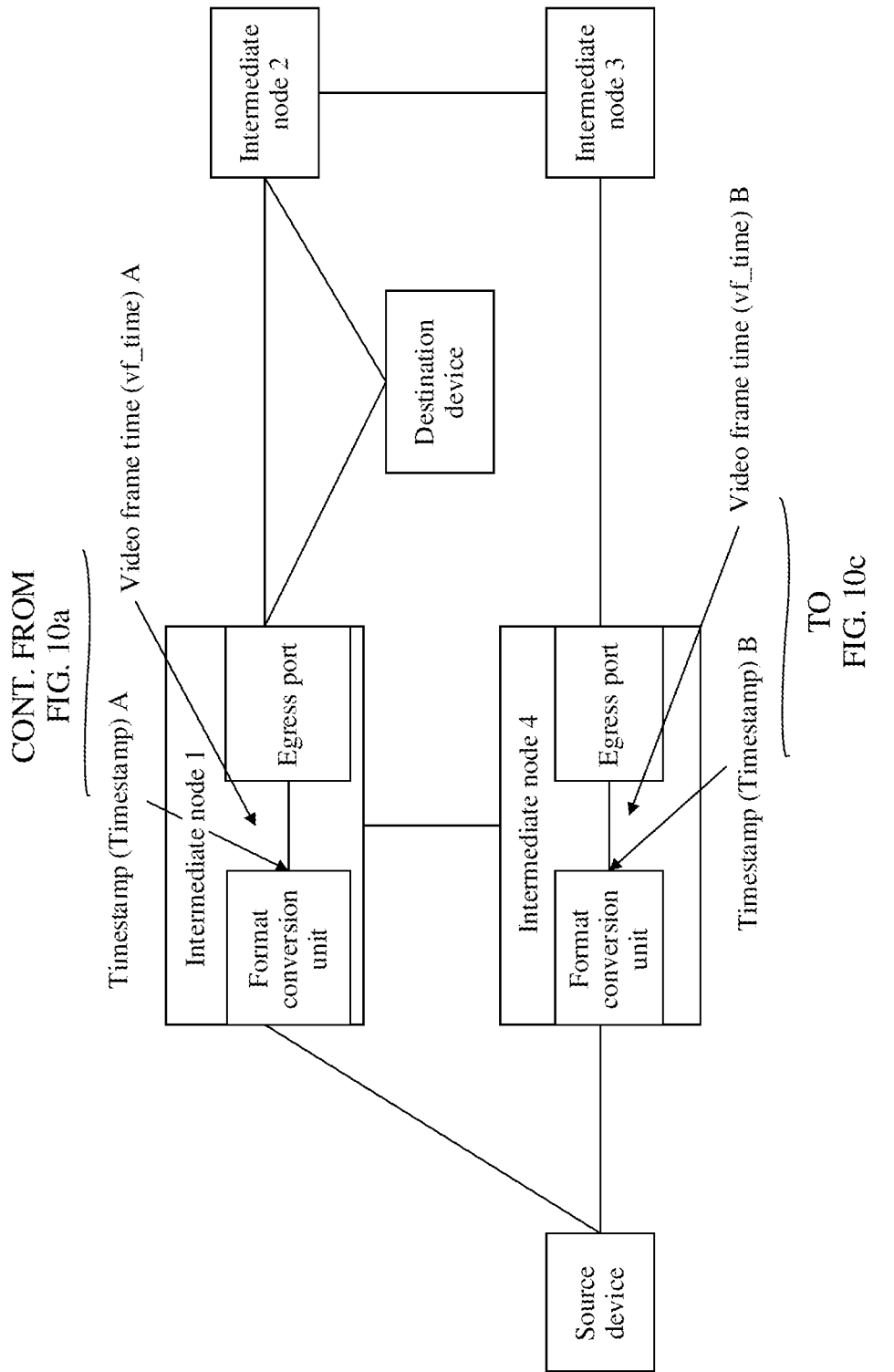

US 11,824,657 B2

FRAME PROCESSING METHOD AND APPARATUS

CROSS-REFERENCE TO RELATED APPLICATIONS

This application is a continuation of International Application No. PCT/CN2020/110595, filed on Aug. 21, 2020, which claims priority to Chinese Patent Application No. 201910820657.5, filed on Aug. 29, 2019. The disclosures of the aforementioned applications are hereby incorporated by reference in their entireties.

TECHNICAL FIELD

This application relates to the field of data processing technologies, and in particular, to a frame processing method and apparatus.

BACKGROUND

An existing dual fed and selective receiving mechanism is implemented based on maintaining a same sequence number for a same data frame of a type of data stream. Specifically, when sending two same data streams to a destination device via two intermediate nodes, a source device may configure a same sequence number for a same data frame of a same data stream. In this way, when receiving data frames configured with a same sequence number, the destination device may determine that one of the data frames is a repeatedly sent data frame, and may further selectively receive one of the data frames, and discard a duplicate data frame other than the received one.

The current dual fed and selective receiving mechanism is only applicable to a scenario in which a device that configures a sequence number for a data frame supports an Ethernet protocol. However, a sequence number cannot be configured for data transmitted by using a non-Ethernet protocol. Consequently, the destination device cannot continue to perform selective receiving based on the sequence number. Therefore, in a dual fed and selective receiving scenario in which a sequence number cannot be configured, how to process data to implement selective receiving is a technical problem to be resolved.

SUMMARY

Embodiments of this application provide a frame processing method and apparatus, to implement dual fed and selective receiving without using a sequence number.

According to a first aspect, an embodiment of this application provides a frame processing method, including: A destination device receives a first Ethernet frame from a first intermediate node through a first interface, where the first Ethernet frame includes a first time point, and the first time point is a processing time point of the first Ethernet frame on the first intermediate node. The destination device receives a second Ethernet frame from a second intermediate node through a second interface, where the second Ethernet frame includes a second time point, and the second time point is a processing time point of the second Ethernet frame on the second intermediate node. Further, the destination device determines, based on the first time point and the second time point, whether the second Ethernet frame is a duplicate frame of the first Ethernet frame.

In a possible implementation, the first time point is a sending time point at which the first Ethernet frame is sent on the first intermediate node, and the second time point is a sending time point at which the second Ethernet frame is sent on the second intermediate node. Alternatively, the first time point is a frame generation time point at which the first Ethernet frame is generated on the first intermediate node, and the second time point is a frame generation time point at which the second Ethernet frame is generated on the second intermediate node. Alternatively, the first time point is a receiving time point at which data corresponding to the first Ethernet frame is received on the first intermediate node, and the second time point is a receiving time point at which data corresponding to the second Ethernet frame is received on the second intermediate node.

In a possible implementation, before the destination device determines, based on the first time point and the second time point, whether the second Ethernet frame is a duplicate frame of the first Ethernet frame, the method further includes: The destination device obtains a transmission time interval, where the transmission time interval is a transmission time interval between two consecutive Ethernet frames, and the two consecutive Ethernet frames belong to a same data stream of the first Ethernet frame or the second Ethernet frame.

In a possible implementation, the destination device may further obtain a preset base time point.

In a possible implementation, that the destination device determines, based on the first time point and the second time point, whether the second Ethernet frame is a duplicate frame of the first Ethernet frame includes: When determining, based on the first time point and the second time point, that an absolute value of a difference between the first time point and the second time point is less than the transmission time interval, the destination device determines that the second Ethernet frame is the duplicate frame of the first Ethernet frame. When determining, based on the first time point and the second time point, that an absolute value of a difference between the first time point and the second time point is greater than or equal to the transmission time interval, the destination device determines that the second Ethernet frame is not the duplicate frame of the first Ethernet frame.

In a possible implementation, that the destination device determines, based on the first time point and the second time point, whether the second Ethernet frame is a duplicate frame of the first Ethernet frame includes: The destination device determines a first virtual sequence number corresponding to the first time point based on the first time point, the base time point, and the transmission time interval. The destination device determines a second virtual sequence number corresponding to the second time point based on the second time point, the base time point, and the transmission time interval. If determining that the first virtual sequence number and the second virtual sequence number are the same, the destination device determines that the second Ethernet frame is the duplicate frame of the first Ethernet frame. If determining that the first virtual sequence number and the second virtual sequence number are different, the destination device determines that the second Ethernet frame is not the duplicate frame of the first Ethernet frame.

In a possible implementation, that the destination device determines a first virtual sequence number corresponding to the first time point based on the first time point, the base time point, and the transmission time interval includes: The destination device determines the first virtual sequence number based on a formula $m + \lfloor (t\_k1 - t\_base)/t\_diff \rfloor$. That the destination device determines a second virtual sequence number corresponding to the second time point based on the second time point, the base time point, and the transmission time interval includes: The destination device determines the second virtual sequence number according to a formula $m+\lfloor(t\_k2-t\_base)/t\_diff\rfloor$. m is an integer greater than or equal to 1, t_k1 is the first time point, t_k2 is the second time point, t_base is the base time point, both t_k1 and t_k2 are greater than t_base, t_diff is the transmission time interval, and $\lfloor\ \rfloor$ is a round-down operation.

In a possible implementation, the base time point is a sending time point or a frame generation time point at which a 1st Ethernet frame that belongs to the same data stream as the first Ethernet frame is sent or generated on the first intermediate node, or a receiving time point of data corresponding to the 1st Ethernet frame is received on the first intermediate node. Alternatively, the base time point is a sending time point or a frame generation time point at which a 1st Ethernet frame that belongs to the same data stream as the second Ethernet frame is sent or generated on the second intermediate node, or a receiving time point of data corresponding to the 1st Ethernet frame on the second intermediate node.

In a possible implementation, the second Ethernet frame further includes a first continuity count value, and the first continuity count value is used to represent a generation order of the second Ethernet frame. Based on this implementation, if determining, based on the first continuity count value and a second continuity count value, that the second Ethernet frame and a third Ethernet frame are nonconsecutive, the destination device discards the second Ethernet frame and n frames after the second Ethernet frame that are received through a second port. n is an integer greater than or equal to 1, the second continuity count value is a count value included in the third Ethernet frame, the second continuity count value is used to represent a generation order of the third Ethernet frame, and the third Ethernet frame is a frame received before the second Ethernet frame through the second interface.

In a possible implementation, the second Ethernet frame further includes a first video frame time, and the first video frame time is a video frame time of a video frame to which video content carried in the second Ethernet frame belongs. Based on this implementation, if determining that the first video frame time is not equal to a preset value, or determining that a difference between the first video frame time and a second video frame time is not equal to the preset value, the destination device discards the second Ethernet frame and n frames after the second Ethernet frame that are received through the second port. n is an integer greater than or equal to 1, the second video frame time is a video frame time of a video frame to which video content carried in a fourth Ethernet frame belongs, and the fourth Ethernet frame is received before the second Ethernet frame through the second interface.

In a possible implementation, if determining that the second Ethernet frame is the duplicate frame of the first Ethernet frame, the destination device discards the second Ethernet frame. Alternatively, if determining that the second Ethernet frame is not the duplicate frame of the first Ethernet frame, the destination device stores the second Ethernet frame.

In a possible implementation, lower k bits at the first time point are carried in a sequence number field included in the first Ethernet frame; and/or low k bits at the second time point are carried in a sequence number field included in the second Ethernet frame, and k is a positive integer less than or equal to 16.

In a possible implementation, a local clock of the first intermediate node is synchronized with a local clock of the second intermediate node.

In a possible implementation, time precision of the time point reaches at least a 100-nanoseconds (ns) level.

According to a second aspect, an embodiment of this application provides a frame processing method, including: An intermediate node receives a data stream from a source device, where the data stream is transmitted by using a non-Ethernet protocol. The intermediate node converts the data stream into at least one Ethernet frame. The intermediate node determines a processing time point of each Ethernet frame, where the corresponding Ethernet frame carries the time point. The intermediate node sends the Ethernet frame carrying the time point to a destination device.

In a possible implementation, the time point is a sending time point at which the Ethernet frame is sent on the intermediate node, the time point is a frame generation time point at which the Ethernet frame is generated on the intermediate node, or the time point is a receiving time point at which data corresponding to the Ethernet frame is received on the intermediate node.

In a possible implementation, the non-Ethernet protocol includes any one of the following protocols: a low-voltage differential signal (LVDS) transmission protocol, a gigabit multimedia serial link (GMSL) transmission protocol, or a control area network (CAN) transmission protocol.

In a possible implementation, the intermediate node determines a continuity count value of each Ethernet frame, where the corresponding Ethernet frame carries the continuity count value, and the continuity count value is used to represent a generation order of the Ethernet frame.

In a possible implementation, the data stream is a video stream. Based on this implementation, the intermediate node obtains a video frame time of a video frame to which video content carried in each Ethernet frame belongs, where the corresponding Ethernet frame carries the video frame time.

In a possible implementation, lower k bits at the time point are carried in a sequence number field included in the Ethernet frame, and k is a positive integer less than or equal to 16.

In a possible implementation, time precision of the time point reaches at least a 100-ns level.

According to a third aspect, an embodiment of this application provides a frame processing method, including: A destination device receives a first Ethernet frame from a first intermediate node through a first interface, where the first Ethernet frame includes a first time point, and the first time point is a processing time point of the first Ethernet frame on the first intermediate node. The destination device receives a second Ethernet frame from a second intermediate node through a second interface, where the second Ethernet frame includes a second time point, and the second time point is a processing time point of the second Ethernet frame on the second intermediate node. Further, the destination device determines, based on the first time point and the second time point, whether the second Ethernet frame is a duplicate frame of the first Ethernet frame.

In a possible implementation, the first time point is a sending time point at which the first Ethernet frame is sent on the first intermediate node, and the second time point is a sending time point at which the second Ethernet frame is sent on the second intermediate node. Alternatively, the first time point is a receiving time point at which the first Ethernet frame is received on the first intermediate node, and the second time point is a receiving time point at which the second Ethernet frame is received on the second intermediate node.

In a possible implementation, before the destination device determines, based on the first time point and the second time point, whether the second Ethernet frame is a duplicate frame of the first Ethernet frame, the method further includes: The destination device obtains a transmission time interval, where the transmission time interval is a transmission time interval between two consecutive Ethernet frames, and the two consecutive Ethernet frames belong to a same data stream of the first Ethernet frame or the second Ethernet frame.

In a possible implementation, the destination device may further obtain a preset base time point.

In a possible implementation, that the destination device determines, based on the first time point and the second time point, whether the second Ethernet frame is a duplicate frame of the first Ethernet frame includes: When determining, based on the first time point and the second time point, that an absolute value of a difference between the first time point and the second time point is less than the transmission time interval, the destination device determines that the second Ethernet frame is the duplicate frame of the first Ethernet frame. When determining, based on the first time point and the second time point, that an absolute value of a difference between the first time point and the second time point is greater than or equal to the transmission time interval, the destination device determines that the second Ethernet frame is not the duplicate frame of the first Ethernet frame.

In a possible implementation, that the destination device determines, based on the first time point and the second time point, whether the second Ethernet frame is a duplicate frame of the first Ethernet frame includes: The destination device determines a first virtual sequence number corresponding to the first time point based on the first time point, the base time point, and the transmission time interval. The destination device determines a second virtual sequence number corresponding to the second time point based on the second time point, the base time point, and the transmission time interval. If determining that the first virtual sequence number and the second virtual sequence number are the same, the destination device determines that the second Ethernet frame is the duplicate frame of the first Ethernet frame. If determining that the first virtual sequence number and the second virtual sequence number are different, the destination device determines that the second Ethernet frame is not the duplicate frame of the first Ethernet frame.

In a possible implementation, that the destination device determines a first virtual sequence number corresponding to the first time point based on the first time point, the base time point, and the transmission time interval includes: The destination device determines the first virtual sequence number based on a formula $m+\lfloor(t\_k1-t\_base)/t\_diff\rfloor$. That the destination device determines a second virtual sequence number corresponding to the second time point based on the second time point, the base time point, and the transmission time interval includes: The destination device determines the second virtual sequence number according to a formula $m+\lfloor(t\_k2-t\_base)/t\_diff\rfloor$. m is an integer greater than or equal to 1, $t\_k1$ is the first time point, $t\_k2$ is the second time point, $t\_base$ is the base time point, both $t\_k1$ and $t\_k2$ are greater than $t\_base$, $t\_diff$ is the transmission time interval, and $\lfloor\ \rfloor$ is a round-down operation.

In a possible implementation, the base time point is a sending time point at which a 1st Ethernet frame that belongs to the same data stream as the first Ethernet frame is sent on the first intermediate node, or a receiving time point at which the 1st Ethernet frame is received on the first intermediate node. Alternatively, the base time point is a sending time point at which a 1st Ethernet frame that belongs to the same data stream as the second Ethernet frame is sent on the second intermediate node, or a receiving time point at which the 1st Ethernet frame is received on the second intermediate node.

In a possible implementation, the second Ethernet frame further includes a first continuity count value, and the first continuity count value is used to represent a receiving order of the second Ethernet frame on the second intermediate node. Based on this implementation, if determining, based on the first continuity count value and a second continuity count value, that the second Ethernet frame and a third Ethernet frame are nonconsecutive, the destination device discards the second Ethernet frame and n frames after the second Ethernet frame that are received through a second port. n is an integer greater than or equal to 1, the second continuity count value is a count value included in the third Ethernet frame, the second continuity count value is used to represent a receiving order of the third Ethernet frame on the second intermediate node, and the third Ethernet frame is received before the second Ethernet frame through the second interface.

In a possible implementation, if determining that the second Ethernet frame is the duplicate frame of the first Ethernet frame, the destination device discards the second Ethernet frame. Alternatively, if determining that the second Ethernet frame is not the duplicate frame of the first Ethernet frame, the destination device stores the second Ethernet frame.

In a possible implementation, lower k bits at the first time point are carried in a sequence number field included in the first Ethernet frame; and/or low k bits at the second time point are carried in a sequence number field included in the second Ethernet frame, and k is a positive integer less than or equal to 16.

In a possible implementation, a local clock of the first intermediate node is synchronized with a local clock of the second intermediate node.

In a possible implementation, time precision of the time point reaches at least a 100-nanosecond level.

According to a fourth aspect, an embodiment of this application provides a frame processing method, including: An intermediate node receives at least one Ethernet frame from a source device, determines a processing time point of each Ethernet frame, where the corresponding Ethernet frame carries the processing time point. Further, the intermediate node sends the Ethernet frame carrying the processing time point to a destination device.

In a possible implementation, the time point is a sending time point at which the Ethernet frame is sent on the intermediate node, or the time point is a receiving time point at which the Ethernet frame is received on the intermediate node.

In a possible implementation, the intermediate node may further determine a continuity count value of each Ethernet frame, where the corresponding Ethernet frame carries the continuity count value, and the continuity count value is used to represent a receiving order of the Ethernet frame.

In a possible implementation, lower k bits at the time point are carried in a sequence number field included in the Ethernet frame, and k is a positive integer less than or equal to 16.

In a possible implementation, time precision of the time point reaches at least a 100-ns level.

According to a fifth aspect, this application provides a frame processing apparatus. The apparatus may be a destination device, or may be a chip used for the destination device. The apparatus has a function of implementing the method according to any one of the first aspect or the possible implementations of the first aspect, or any one of the third aspect or the possible implementations of the third aspect. The function may be implemented by hardware, or may be implemented by hardware executing corresponding software. The hardware or the software includes one or more modules corresponding to the function.

According to a sixth aspect, this application provides a frame processing apparatus. The apparatus may be an intermediate node, or may be a chip used for the intermediate node. The apparatus has a function of implementing the method according to any one of the second aspect or the possible implementations of the second aspect, or any one of the fourth aspect or the possible implementations of the fourth aspect. The function may be implemented by hardware, or may be implemented by hardware executing corresponding software. The hardware or the software includes one or more modules corresponding to the function.

According to a seventh aspect, this application provides a frame processing apparatus, including at least one processor and a memory. The memory is configured to store computer-executable instructions. When the apparatus runs, the at least one processor executes the computer-executable instructions stored in the memory, so that the apparatus performs the method according to any one of the first aspect or the possible implementations of the first aspect, or any one of the third aspect or the possible implementations of the third aspect.

According to an eighth aspect, this application provides a frame processing apparatus, including at least one processor and a memory. The memory is configured to store computer-executable instructions. When the apparatus runs, the at least one processor executes the computer-executable instructions stored in the memory, so that the apparatus performs the method according to any one of the second aspect or the possible implementations of the second aspect, or any one of the fourth aspect or the possible implementations of the fourth aspect.

According to a ninth aspect, this application provides a frame processing apparatus, including at least one processor and an interface circuit. The at least one processor is configured to communicate with another apparatus via the interface circuit, and perform the method according to any one of the first aspect or the possible implementations of the first aspect, or any one of the third aspect or the possible implementations of the third aspect.

According to a tenth aspect, this application provides a frame processing apparatus, including at least one processor and an interface circuit. The at least one processor is configured to communicate with another apparatus via the interface circuit, and perform the method according to any one of the second aspect or the possible implementations of the second aspect, or any one of the fourth aspect or the possible implementations of the fourth aspect.

According to an eleventh aspect, this application provides a frame processing apparatus, including at least one processor. The at least one processor is configured to connect to a memory, and invoke a program stored in the memory, to perform the method according to any one of the first aspect or the possible implementations of the first aspect, or any one of the third aspect or the possible implementations of the third aspect. The memory may be located inside the apparatus, or may be located outside the apparatus.

According to a twelfth aspect, this application provides a frame processing apparatus, including at least one processor. The at least one processor is configured to connect to a memory, and configured to invoke a program stored in the memory, to perform the method according to any one of the second aspect or the possible implementations of the second aspect, or any one of the fourth aspect or the possible implementations of the fourth aspect. The memory may be located inside the apparatus, or may be located outside the apparatus.

According to a thirteenth aspect, an embodiment of this application provides a chip system. The chip system includes at least one processor, and may further include a memory, configured to implement the method according to any one of the first aspect or the possible implementations of the first aspect, or any one of the third aspect or the possible implementations of the third aspect. The chip system may include a chip, or may include a chip and another discrete device.

According to a fourteenth aspect, an embodiment of this application provides a chip system. The chip system includes at least one processor, and may further include a memory, configured to implement the method according to any one of the second aspect or the possible implementations of the second aspect, or any one of the fourth aspect or the possible implementations of the fourth aspect. The chip system may include a chip, or may include a chip and another discrete device.

According to a fifteenth aspect, an embodiment of this application provides a system, including a destination device configured to perform the method according to any one of the first aspect or the possible implementations of the first aspect, and an intermediate node configured to perform the method according to any one of the second aspect or the possible implementations of the second aspect. Optionally, the intermediate node may be the first intermediate node and/or the second intermediate node in the first aspect.

According to a sixteenth aspect, an embodiment of this application provides a system, including a destination device configured to perform the method according to any one of the third aspect or the possible implementations of the third aspect, and an intermediate node configured to perform the method according to any one of the fourth aspect or the possible implementations of the fourth aspect. Optionally, the intermediate node may be the first intermediate node and/or the second intermediate node in the third aspect.

According to a seventeenth aspect, an embodiment of this application further provides a computer storage medium. The computer storage medium stores computer-executable instructions. When the computer-executable instructions are invoked by a computer, the computer is enabled to perform the method according to any one of the first aspect or the implementations of the first aspect, or the computer is enabled to perform the method according to any one of the second aspect or the implementations of the second aspect, or the computer is enabled to perform the method according to any one of the third aspect or the implementations of the third aspect, or the computer is enabled to perform the method according to any one of the fourth aspect or the implementations of the fourth aspect.

According to an eighteenth aspect, an embodiment of this application further provides a computer program product. The computer program product stores instructions. When the instructions are run on a computer, the computer is enabled to perform the method according to any one of the first aspect or the possible implementations of the first aspect, or the computer is enabled to perform the method according to any one of the second aspect or the possible implementations of the second aspect, or the computer is enabled to perform the method according to any one of the third aspect or the implementations of the third aspect, or the computer is enabled to perform the method according to any one of the fourth aspect or the implementations of the fourth aspect.

BRIEF DESCRIPTION OF DRAWINGS

FIG. 4a is a schematic diagram of an Ethernet frame format according to an embodiment of this application;

FIG. 4b is a schematic diagram of another Ethernet frame format according to an embodiment of this application;

FIG. 5a-1 to FIG. 5a-3 are a timestamp addition manner according to an embodiment of this application;

FIG. 5b-1 to FIG. 5b-3 are another timestamp addition manner according to an embodiment of this application;

FIG. 7 is a schematic diagram of still another Ethernet frame format according to an embodiment of this application;

FIG. 8a to FIG. 8c are schematic diagrams of another frame processing method according to an embodiment of this application;

FIG. 9 is a schematic diagram of yet another Ethernet frame format according to an embodiment of this application;

FIG. 10a to FIG. 10c are schematic diagrams of still another frame processing method according to an embodiment of this application;

DESCRIPTION OF EMBODIMENTS

Figure 1:
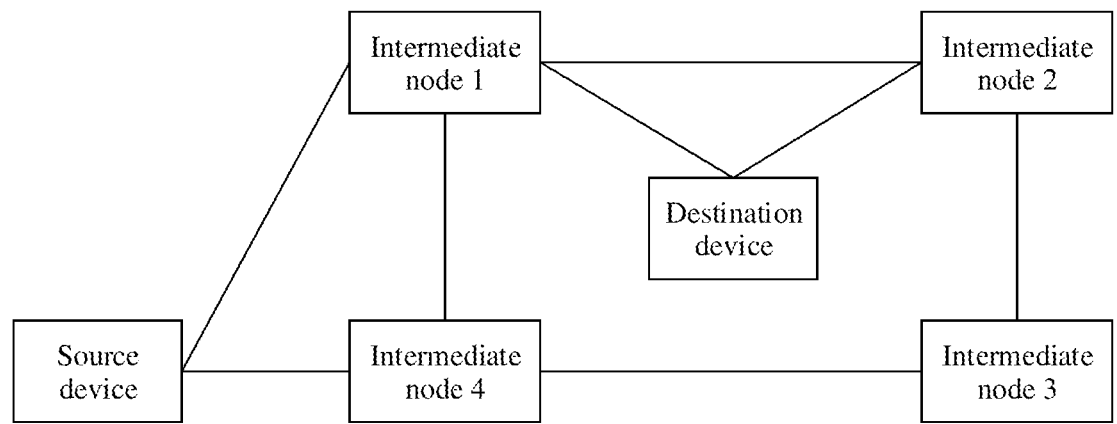
FIG. 1 is a schematic diagram of a network architecture according to an embodiment of this application.

Some terms in embodiments of this application are first described, to help a person skilled in the art have a better understanding.

(1) A dual fed and selective receiving mechanism is a redundancy transmission mechanism to ensure reliable data transmission. By using the dual fed and selective receiving mechanism, a source device or an intermediate node may duplicate same data of the source device into two copies, and send the two copies of the same data to a same destination device through two different paths. The destination device selects to receive one copy of the data, to ensure reliability of data transmission. Currently, the parallel redundancy protocol (PRP) and high-availability seamless redundancy (HSR) protocols defined in the international electrotechnical commission (IEC) 62439-3 standard, and the frame replication and elimination for reliability (FRER) protocol defined in the institute of electrical and electronics engineers (IEEE) 802.1cb standard each support a dual fed and selective receiving mechanism. In the dual fed and selective receiving mechanism supported by each of these protocols, a source device or an intermediate node may duplicate a same Ethernet packet of the source device into two same Ethernet packets, include a same sequence number in each of the two same Ethernet packets, and send the two same Ethernet packets carrying the same sequence numbers to a same destination device through two separate paths. The destination device may determine, based on whether sequence numbers carried in Ethernet packets are the same, whether a received packet is a duplicate packet. If two Ethernet packets carry a same sequence number, it is determined that the two packets are duplicate packets, and the destination device selects to receive one of the duplicate packets and discards the other packet. In the dual fed and selective receiving mechanism, the two duplicate Ethernet packets are sent through the two separate paths, and when one path is faulty, it can still be ensured that the destination device can receive the Ethernet packet through the other path. This improves reliability of data transmission. The dual fed and selective receiving mechanism is implemented based on maintaining a same sequence number for a same packet. This dual fed and selective receiving mechanism is referred to as a dual fed and selective receiving mechanism with an additional sequence number in this application. It should be noted that, currently, this dual fed and selective receiving mechanism with the additional sequence number is only applicable to a scenario in which a node with an additional sequence number supports an Ethernet protocol.

(2) The Ethernet is a local area network standard defined by the IEEE 802.3 standard working group. In the Ethernet, a packet is transmitted in a best effort transmission mode. The Ethernet may include Ethernets with a plurality of rates, such as 10 Mbps, 100 Mbps, 1 Gbps, and 2.5 Gbps to 400 Gbps. The Ethernet defines a connection at a physical layer, an electronic signal, and content of a media access control layer protocol. A latest corresponding standard document is IEEE 802.3-2018.

(3) A best effort transmission mode is a transmission mode that can provide minimum performance guarantee. In the best effort transmission mode, a data source end may send any number of packets at any time point without being approved in advance or notifying a network. The network makes best effort to transmit the packets, but performance such as latency and reliability is not guaranteed.

(4) 10GBASE-T1 (10 gigabit ethernet over 1 twisted pair) is a 10 G Ethernet automotive-grade standard defined by a p802.3ch task group of an IEEE 802.3 standard work group. In 10GBASE-T1, a 10 Gbps Ethernet signal is transmitted by using one twisted pair. 25GBASE-T1 (25 gigabit ethernet over 1 twisted pair) is a 25 G Ethernet automotive-grade standard. In 25GBASE-T1, a 25 Gbps Ethernet signal is transmitted by using one twisted pair. 25GBASE-T1 has not been standardized.

(5) A vehicle-mounted communication network, also referred to as an in-vehicle communication network, is a network used for in-vehicle device communication and/or communication between a vehicle and the outside. The vehicle-mounted communication network has the following features:

a short cable distance, where a length of a single cable is usually less than or equal to 15 m;

higher requirements on ambient temperature tolerance and anti-electromagnetic interference;

a higher reliability requirement (shorter fault recovery time);

a very short network startup time;

a lower end-to-end communication latency; and repeatability/predictability of service traffic transmission behavior.

Among them, the Ethernet released by an IEEE 802.3 standard working group is very popular with network vendors due to a simple and best-effort transmission mode and a standardized interconnection mechanism. With the trend of electric and intelligent automobiles, a vehicle-mounted communication network of the automobile is also evolving towards the Ethernet. Currently, the vehicle-mounted communication network usually uses an Ethernet protocol. The vehicle-mounted communication network in this application refers to a vehicle-mounted communication network that uses the Ethernet protocol.

(6) The terms "system" and "network" in the embodiments of this application may be used interchangeably. A plurality of means two or more. In view of this, "a plurality of" may also be understood as "at least two" in the embodiments of this application. "At least one" may be understood as one or more, for example, one, two, or more. For example, including at least one means including one, two, or more, and which are included is not limited. For example, including at least one of A, B, and C may represent the following cases: A is included, B is included, C is included, A and B are included, A and C are included, B and C are included, or A, B, and C are included. "At least two" may be understood as two or more. Similarly, understanding of descriptions such as "at least one type" is similar. The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects.

Figure 2:
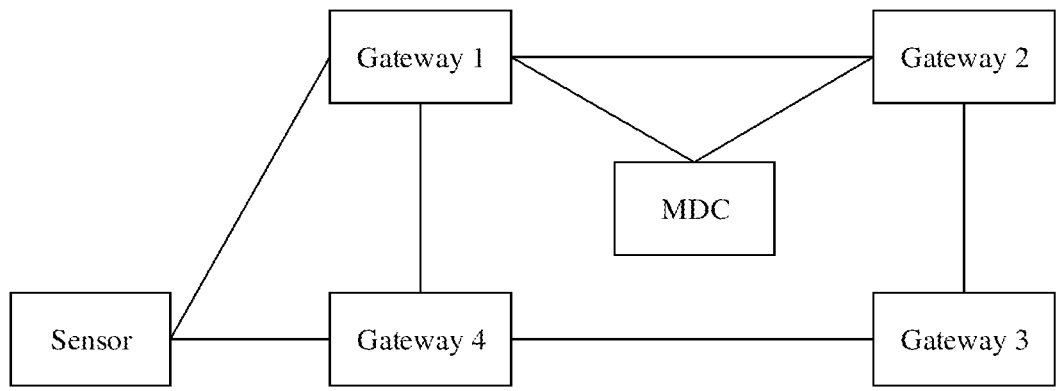
FIG. 2 is a schematic diagram of another network architecture according to an embodiment of this application.

FIG. 1 is a schematic diagram of a network architecture applicable to an embodiment of this application. The network architecture shown in FIG. 1 includes one source device, one destination device, and four intermediate nodes. The four intermediate nodes are an intermediate node 1, an intermediate node 2, an intermediate node 3, and an intermediate node 4. The nodes are connected to form a ring network architecture, and can transmit signals in both clockwise and counterclockwise directions. The source device and the destination device may interact via an intermediate node. For example, the source device may send a signal to the destination device via the intermediate node 1, or may send a signal to the destination device via the intermediate node 4, the intermediate node 3, and the intermediate node 2. FIG. 1 is merely a schematic diagram, and a type of the network architecture, a quantity, a type, and the like of devices included in the network architecture are not limited. For example, FIG. 1 may further include nodes of another type, or may include more source devices and destination devices, or may include more or fewer intermediate nodes. It should be noted that, for different application scenarios, the nodes in the network architecture in FIG. 1 may be different devices. A vehicle-mounted network scenario is used as an example. The network architecture in FIG. 1 may be a vehicle-mounted communication network architecture in FIG. 2. In this application, an example in which a vehicle-mounted communication network uses an Ethernet protocol is used for description. The source device in FIG. 1 may be various types of sensors or an electronic control unit (ECU) that uses a CAN bus signal. In FIG. 2, an example in which the source device is a sensor is used for description. The sensor may be, for example, a camera sensor, a radar sensor, a laser radar sensor, a millimeter wave radar sensor or an ultrasonic sensor. The intermediate node in FIG. 1 may be a gateway. The destination device in FIG. 1 may be a gateway, a processor, a mobile data center (MDC) or another device that can process a data stream. In FIG. 2, an example in which the destination device is an MDC is used for description. The MDC is a functional unit in an intelligent/driverless vehicle and is responsible for processing a signal collected by a sensor of an advanced driver assistance system (ADAS) and making driving decisions. The ADAS is an intelligent system that assists and guides a driver during driving. In FIG. 2, every two gateways may be connected through M Ethernet interfaces whose rates are the same or different, to form a high-bandwidth logical link. M is a positive integer, for example, may be a positive integer greater than or equal to 1 and less than or equal to 5. A single Ethernet interface may be an automotive-grade interface, for example, may be a 10 G automotive-grade (10GBASE-T1) interface or a 25 G automotive-grade (25GBASE-T1) interface.

Based on the network architecture shown in FIG. 2, a signal collected by the sensor may be transmitted to the MDC via a gateway 1, or may be transmitted to the MDC via a gateway 4, a gateway 3, and a gateway 2. To ensure reliability of signal transmission and avoid signal loss caused by a single point fault of the gateway, the sensor may send the collected signal to the MDC through two separate paths via the gateway 1 and the gateway 4 respectively. For example, after collecting a signal, the sensor may send the signal to the gateway 1 and the gateway 4. When the gateway and the sensor use different protocols, after receiving the signal sent by the sensor, the gateway 1 and the gateway 4 may each perform format conversion on the signal. The gateway 1 may directly send a converted signal to the MDC, and the gateway 4 may forward a converted signal to the MDC via the gateway 3 and the gateway 2. The MDC performs selective receiving on the two received duplicate signals, discards a duplicate signal, and processes and analyzes the signal that is not discarded to make a driving decision, to ensure driving safety. Currently, for this solution, the sensor uses a non-Ethernet protocol. A dual fed and selective receiving mechanism with an additional sequence number is only used for an Ethernet protocol. Therefore, when two signals are sent by the sensor that uses the non-Ethernet protocol, a sequence number cannot be added to the sensor side, that is, a sequence number cannot be added to a source device for the sensor that uses the non-Ethernet protocol. Because the gateway uses the Ethernet protocol, it can be considered to add a sequence number to an intermediate node such as the gateway 1 and the gateway 4 after signals received from the sensor are converted into Ethernet frames. However, in the solution of adding the sequence number to the gateway 1 and the gateway 4, synchronization processing needs to be performed on the sequence number added to the gateway 1 and the gateway 4. Generally, there are many types of sensors in a vehicle-mounted communication network architecture. If a plurality of types of sensors are connected to the gateway 1 and the gateway 4, synchronization processing needs to be performed for each type of sensor, the gateway 1 and the gateway 4 need to maintain a sequence number counter for each type of sensor, and periodic synchronization needs to be performed between the gateway 1 and the gateway 4. It is clear that this synchronization solution is complex, increases a possibility of a gateway fault, and reduces communication reliability of a vehicle-mounted network. If the synchronization mechanism is not used, when the gateway 1 or the gateway 4 temporarily crashes or freezes, or when a link between the sensor and the gateway 1 or the gateway 4 is intermittently disconnected, the gateway 1 and the gateway 4 add different sequence numbers to a same data packet or add a same sequence number to different data packets. As a result, the MDC cannot perform correct selective receiving based on a sequence number. That is, for the network architecture shown in FIG. 2, the dual fed and selective receiving mechanism with an additional sequence number is no longer applicable, or it is complex to continue to use the dual fed and selective receiving mechanism with an additional sequence number.

In view of the foregoing problem, embodiments of this application provide a frame processing method and apparatus, to implement dual fed and selective receiving without using a sequence number. The method and the apparatus are based on a same inventive concept. Because problem-resolving principles of the method and the apparatus are similar, apparatus implementation and method implementation may be mutually referenced.

Figure 3:
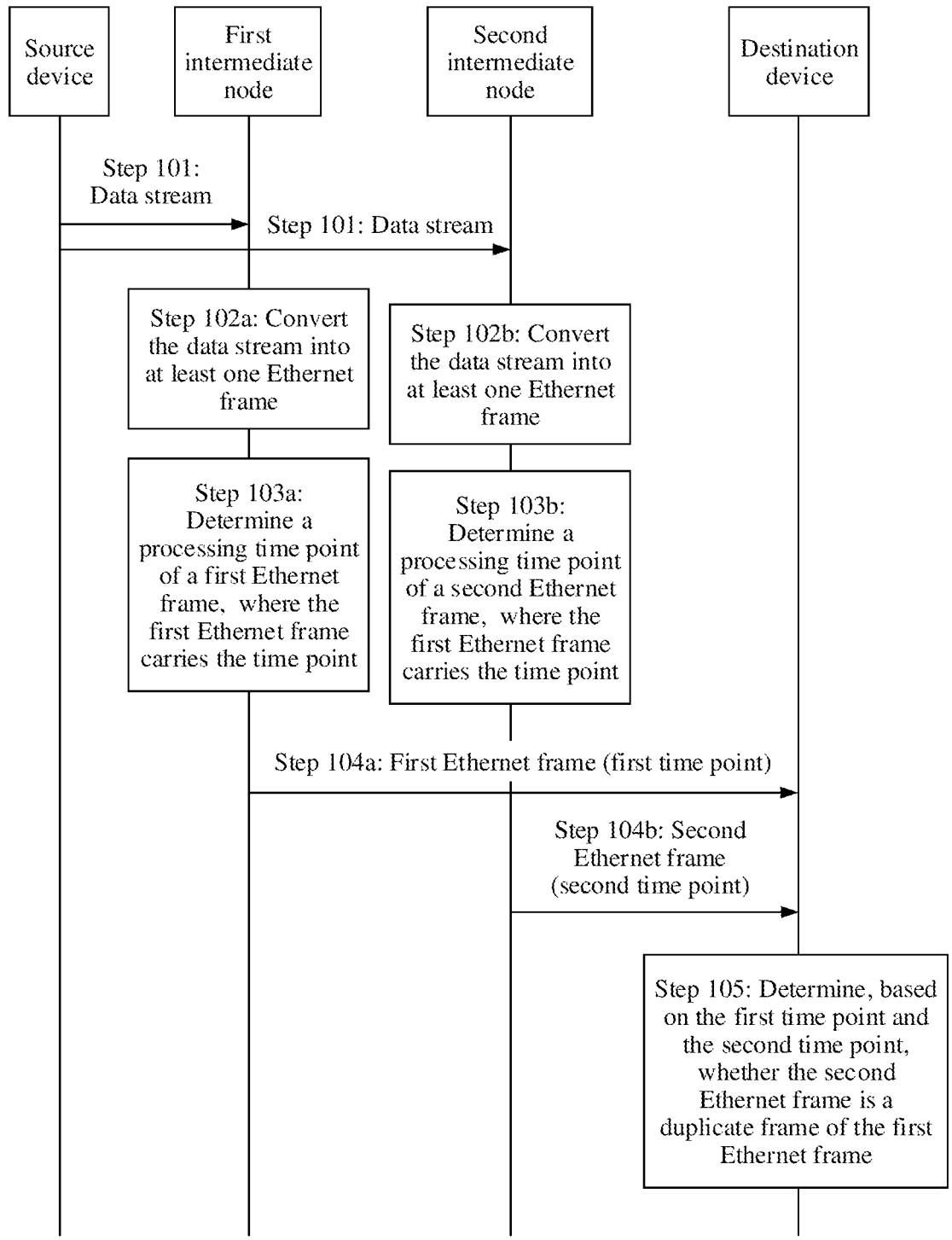
FIG. 3 is a flowchart of a frame processing method according to an embodiment of this application.

FIG. 3 is a schematic flowchart of a frame processing method according to an embodiment of this application. The method may be applied to the network architecture shown in FIG. 1 or FIG. 2, or certainly may be applied to another network architecture. This is not limited in this application. When the method is applied to the network architecture shown in FIG. 1, a destination device involved in the method may be the destination device in FIG. 1. An intermediate node involved in the method may be the intermediate node 1, the intermediate node 2, the intermediate node 3, or the intermediate node 4 in FIG. 1. A source device involved in the method may be the source device in FIG. 1. When the method is applied to the network architecture shown in FIG. 2, a destination device in the method may be the MDC in FIG. 2. An intermediate node in the method may be the gateway 1, the gateway 2, the gateway 3, or the gateway 4 in FIG. 2. A source device involved in the method may be the sensor in FIG. 2. The method includes the following steps.

Step 101: The source device simultaneously sends a same data stream to a first intermediate node and a second intermediate node through two separate paths, where the data stream is transmitted by using a non-Ethernet protocol. The separate paths may be, for example, two separate physical links. One physical link is a link between the source device and the first intermediate node, and the other physical link is a link between the source device and the second intermediate node. The non-Ethernet protocol may include but is not limited to an LVDS transmission protocol, a GMSL transmission protocol, or a CAN transmission protocol. In some embodiments of this application, one data stream may be corresponding to one service, and a same data stream is corresponding to a same service. A source device and an intermediate node may use a same protocol, or may use different protocols. In this application, an example in which the source device uses the non-Ethernet protocol, and the first intermediate node and the second intermediate node each use an Ethernet protocol is used for description.

It should be noted that the method provided in some embodiments of this application may not only be applied to a scenario in which the source device transmits a data stream by using a non-Ethernet protocol, but also may be applied to a scenario in which the source device transmits a data stream by using an Ethernet protocol. In some embodiments of this application, an example in which the source device transmits a data stream by using a non-Ethernet protocol is mainly used for description.

Because the first intermediate node and the second intermediate node each uses the Ethernet protocol, and the source device uses the non-Ethernet protocol, after receiving the data stream sent by the source device, the first intermediate node and the second intermediate node need to perform format conversion. For details, refer to descriptions in step 102*a* and step 102*b*.

Step 102*a*: The first intermediate node converts the received data stream into at least one Ethernet frame. Optionally, the first intermediate node may convert, via a data stream format conversion unit, the received data stream into at least one Ethernet frame, which may be understood as: The data stream format conversion unit converts a non-Ethernet data stream into a data stream in an Ethernet format.

Step 102*b*: The second intermediate node converts the received data stream into at least one Ethernet frame. Optionally, the second intermediate node may convert, via the data stream format conversion unit, the received data stream into at least one Ethernet frame.

The second intermediate node and the first intermediate node may convert the data stream into the Ethernet frames by using a same conversion protocol. In some embodiments of this application, the link between the source device and the first intermediate node and the link between the source device and the second intermediate node have different lengths and link quality. Therefore, an arrival time of the data stream sent by the source device to the first intermediate node and the second intermediate node may also be different.

It should be noted that, after the first intermediate node and the second intermediate node convert the data stream received from the source device into the Ethernet frames, a processing procedure for each Ethernet frame is the same. The following uses an example in which the first intermediate node processes a first Ethernet frame in the at least one converted Ethernet frame, and the second intermediate node processes a second Ethernet frame in the at least one converted Ethernet frame for description.

Step 103*a*: The first intermediate node determines a processing time point of the first Ethernet frame, and records the time point as a first time point, where the first Ethernet frame carries the first time point. In the present disclosure, the processing time point may also be described as a timestamp. In the following, the processing time point and the timestamp may be interchanged, and represent a same meaning.

Step 103*b*: The second intermediate node determines a processing time point of the second Ethernet frame, and records the time point as a second time point, where the second Ethernet frame carries the second time point.

In some embodiments of this application, the first time point may be carried in an existing field of the first Ethernet frame, or a new field may be added to the first Ethernet frame to carry the first time point. Similarly, the second time point may be carried in an existing field of the second Ethernet frame, or a new field may be added to the second Ethernet frame to carry the second time point.

It should be noted that the first intermediate node and the second intermediate node may convert the received data stream into different types of Ethernet frames based on a type of a conversion protocol. The conversion protocol used in embodiments of this application is not limited. For example, the data stream is converted into an Ethernet frame in an IEEE 802.1cb format as an example. Lower k bits at the first time point may be carried in a sequence number field included in the first Ethernet frame in the IEEE 802.1cb format. Lower k bits at the second time point may be carried in a sequence number field included in the second Ethernet frame in the IEEE 802.1cb format. k is a positive integer less than or equal to 16. For example, k is 16. Higher 8 bits in lower 16 bits may be carried in or written into a 1st octet in the sequence number field, and lower 8 bits in the lower 16 bits may be carried in or written into a 2nd octet in the sequence number field. FIG. 4a is a schematic diagram of an Ethernet frame in an IEEE 802.1cb format. FIG. 4b is a schematic diagram of a modified Ethernet frame according to an embodiment of this application. In FIG. 4b, lower 16 bits of a processing time point (for example, the first time point or the second time point) and a sequence number field included in an Ethernet frame carried in the IEEE 802.1cb format are used as an example.

In addition, to distinguish the first Ethernet frame and the second Ethernet frame from an existing Ethernet frame, or it may be understood that, to distinguish whether the Ethernet frame carries a processing time point (where an Ethernet frame carrying a processing time point is the Ethernet frame in an embodiment of this application, and an Ethernet frame that does not carry a processing time point is the existing Ethernet frame), in an example, Ethertype fields in the first Ethernet frame and the second Ethernet frame may be modified. For example, the existing Ethernet frame is the Ethernet frame in the IEEE 802.1cb format shown in FIG. 4a. In this application, an Ethertype field included in the existing Ethernet frame in the IEEE 802.1cb format may be modified from XXXX to YYYY, to distinguish the existing Ethernet frame from the Ethernet frame carrying the processing time point provided in this application. In some embodiments of this application, Ethertype fields in the first Ethernet frame and the second Ethernet frame are not modified. A reserved field in an Ethernet frame may be used to indicate that the Ethernet frame is an Ethernet frame in an existing format (for example, an Ethernet frame in the 802.1cb format or a standard Ethernet frame) or an Ethernet frame in a format provided in this application, or indicate whether the Ethernet frame carries a processing time point. For example, the first Ethernet frame and the second Ethernet frame are Ethernet frames in the 802.1cb format. At least one bit in a 16-bit reserved field in an Ethernet frame in the 802.1cb format may be used to indicate that the Ethernet frame is the Ethernet frame in the existing format (for example, an Ethernet frame in the 802.1cb format or a standard Ethernet frame) or an Ethernet frame in the format provided in an embodiment of this application, or indicates whether the Ethernet frame carries a processing time point, to distinguish the existing Ethernet frame from the Ethernet frame carrying the processing time point provided in an embodiment of this application.

In some embodiments of this application, local clocks of the first intermediate node and the second intermediate node may always be synchronized, or synchronization may be performed between a local clock of the first intermediate node and a local clock of the second intermediate node before step 103a and step 103b are performed. Synchronization of a plurality of local clocks in this application may be understood as that a plurality of local clocks have no time offset or have a time offset less than 1 microsecond (μs).

Optionally, the first intermediate node and the second intermediate node may perform clock synchronization by using the IEEE 802.1AS timing and synchronization standard, the IEEE 1588v2 precision time protocol, or the IEEE 1588v8 time synchronization protocol.

It should be noted that, if the foregoing method is applied to a vehicle-mounted communication network, in addition to the first intermediate node and the second intermediate node that may maintain clock synchronization, any node in the vehicle-mounted communication network may maintain clock synchronization. In some embodiments of this application, the data stream of one source device is received as an example for description. In addition, when a plurality of source devices use the method in this application, clock synchronization may also be performed between the plurality of source devices.

The processing time point of the first Ethernet frame and the processing time point of the second Ethernet frame may be processing time points in a same processing stage, for example, each may be a sending time point in a sending stage, or may be a frame generation time point in a frame generation stage. Time precision of the time point may reach at least a 100 ns level. For example, the time precision of the time point may be 50 ns, 100 ns, or the like.

In an example, the first time point may be a sending time point at which the first Ethernet frame is sent on the first intermediate node, and the second time point may be a sending time point of the second Ethernet frame on the second intermediate node.

In another example, the first time point may be a frame generation time point at which the first Ethernet frame is generated on the first intermediate node, and the second time point may be a frame generation time point at which the second Ethernet frame is generated on the second intermediate node.

In still another example, the first time point may be a receiving time point of data corresponding to the first Ethernet frame on the first intermediate node, and the second time point may be a receiving time point of data corresponding to the second Ethernet frame on the second intermediate node.

In a possible implementation, if the data stream sent by the source device to the first intermediate node and the second intermediate node use the Ethernet protocol, the source device transmits the data stream in a form of an Ethernet frame. Correspondingly, the first intermediate node and the second intermediate node may receive a plurality of Ethernet frames that belong to the data stream. In this case, the first time point may be a receiving time point of the first Ethernet frame on the first intermediate node, and the second time point may be a receiving time point of the second Ethernet frame on the second intermediate node. Alternatively, the first time point may be a sending time point at which the first Ethernet frame is sent on the first intermediate node, and the second time point may be a sending time point at which the second Ethernet frame is sent on the second intermediate node.

Figures 1, 5A:
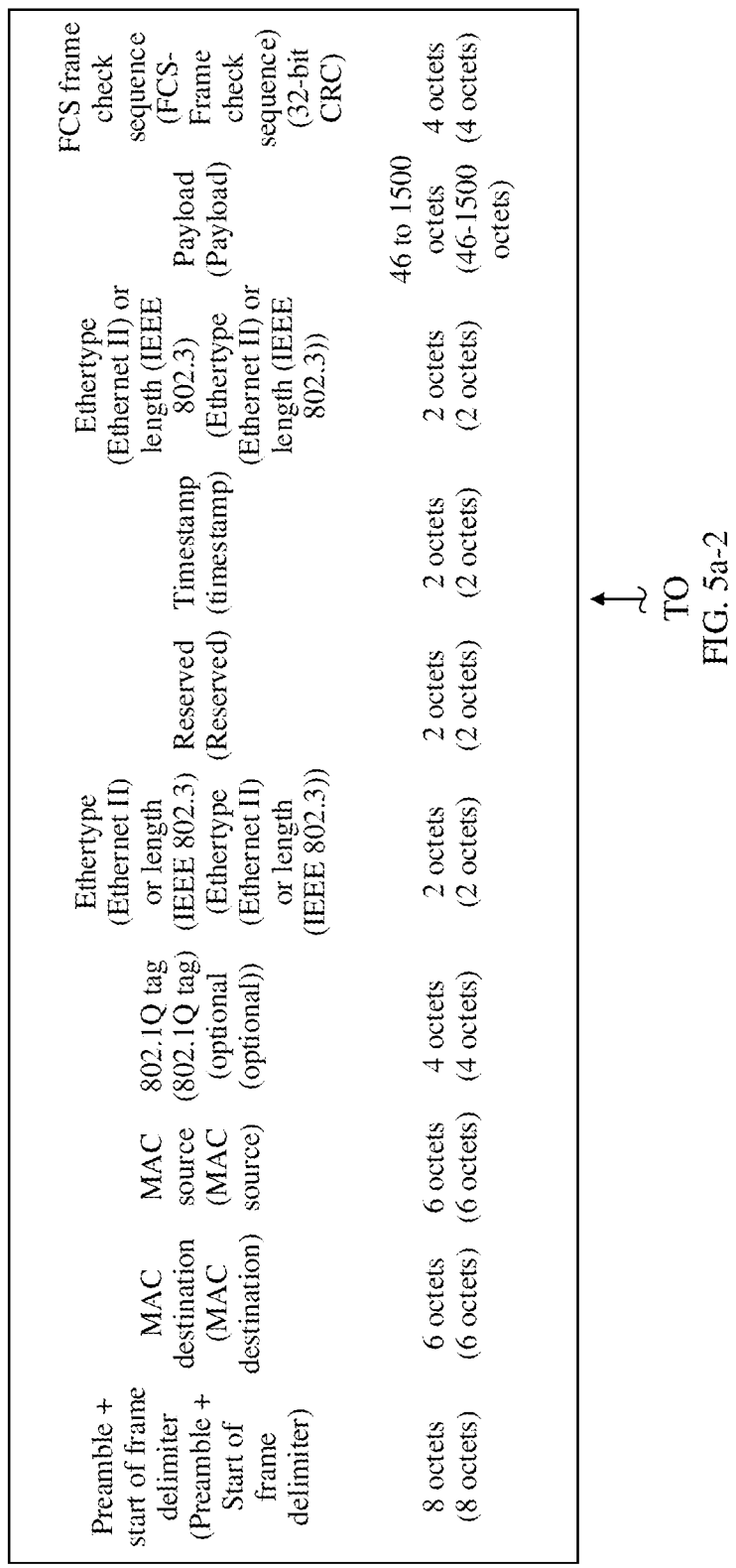
Figures 3, 5A:
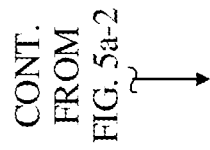

Optionally, the sending time point at which the first Ethernet frame is sent on the first intermediate node may be a time point at which the first Ethernet frame reaches an egress port of the first intermediate node. For example, the time point at which the first Ethernet frame reaches the egress port of the first intermediate node may be a time point of reaching a media access control (MAC) layer of the egress port of the first intermediate node, or a time point of reaching a physical layer (PHY) of the egress port of the first intermediate node, for example, a time point of reaching a serializer/deserializer (SerDes) layer in the PHY layer, or a time point of reaching an interface between the MAC layer and the PHY layer of the egress port of the first intermediate node. Similarly, the sending time point of the second Ethernet frame on the second intermediate node may be a time point at which the second Ethernet frame reaches an egress port of the second intermediate node. For example, the time point at which the second Ethernet frame reaches the egress port of the second intermediate node may be a time point of reaching a MAC layer of the egress port of the second intermediate node, or a time point of reaching a PHY layer of the egress port of the second intermediate node, for example, a time point of reaching a SerDes layer in the PHY layer, or a time point of reaching an interface between the MAC layer and the PHY layer of the egress port of the second intermediate node. The interface between the MAC layer and the PHY layer may be, for example, a media independent interface (MII). FIG. 5a-1 to FIG. 5a-3 show a manner of adding a timestamp to an egress port. In FIG. 5a-1 to FIG. 5a-3, an example in which a first time point is a timestamp A and a second time point is a timestamp B is used as an example. The intermediate node 1 determines a time point at which the first Ethernet frame reaches the egress port of the intermediate node 1 as the timestamp A, where the first Ethernet frame carries the time point. The intermediate node 4 determines a time point at which the second Ethernet frame reaches the egress port of the intermediate node 4 as the timestamp B, where the second Ethernet frame carries the time point.

Optionally, the frame generation time point of the first Ethernet frame on the first intermediate node may be a time point at which the first intermediate node generates the complete first Ethernet frame. Similarly, the frame generation time point of the second Ethernet frame on the second intermediate node may be a time point at which the second intermediate node generates the complete second Ethernet frame. As shown in FIG. 5b-1 to FIG. 5b-3, an example in which a format conversion unit of an intermediate node adds a timestamp is used for description, and an example in which the first time point is a timestamp A and the second time point is a timestamp B is used for description. The intermediate node 1 determines the time point at which the complete first Ethernet frame is generated as the timestamp A, where the first Ethernet frame carries the time point. The intermediate node 4 determines the time point at which the complete second Ethernet frame is generated as the timestamp B, where the second Ethernet frame carries the time point.

Optionally, the receiving time point of the first Ethernet frame or the data corresponding to the first Ethernet frame on the first intermediate node may be a time point at which the first Ethernet frame or the data corresponding to the first Ethernet frame reaches an ingress port of the first intermediate node. For example, the time point at which the first Ethernet frame or the data corresponding to the first Ethernet frame reaches the ingress port of the first intermediate node may be a time point of reaching a MAC layer of the ingress port of the first intermediate node, or a time point of reaching a PHY of the ingress port of the first intermediate node, for example, a time point of reaching a SerDes layer in the PHY layer, or a time point of reaching an interface between the MAC layer and the PHY layer of the ingress port of the first intermediate node. Similarly, the receiving time point of the second Ethernet frame or the data corresponding to the second Ethernet frame on the second intermediate node may be a time point at which the second Ethernet frame or the data corresponding to the second Ethernet frame reaches an ingress port of the second intermediate node. For example, the time point at which the second Ethernet frame or the data corresponding to the second Ethernet frame reaches the ingress port of the second intermediate node may be a time point of reaching a MAC layer of the ingress port of the second intermediate node, or a time point of reaching a PHY of the ingress port of the second intermediate node, for example, a time point of reaching a SerDes layer in the PHY layer, or a time point of reaching an interface between the MAC layer and the PHY layer of the ingress port of the second intermediate node. The interface between the MAC layer and the PHY layer may be, for example, an MII interface.

It should be noted that, in some embodiments of this application, after determining a processing time point of an Ethernet frame, the intermediate node may immediately write the processing time point into the Ethernet frame, or may write the processing time point into the Ethernet frame in subsequent processing. For example, in FIG. 5b-1 to FIG. 5b-3, after generating a processing time point at the format conversion unit, the intermediate node may write, at the format conversion unit, the processing time point into an Ethernet frame, or may write, at an egress port, the processing time point into the Ethernet frame. This is not limited in this application.

Step 104a: The first intermediate node sends the first Ethernet frame including the first time point to the destination device, and correspondingly, the destination device receives the first Ethernet frame from the first intermediate node through a first interface. It may be understood that the first interface is an interface between the destination device and the first intermediate node. For example, the first intermediate node may send the first Ethernet frame including the first time point to a preconfigured interface, and may further send the first Ethernet frame to the destination device according to a pre-agreed path through the interface.

Step 104b: The second intermediate node sends the second Ethernet frame including the second time point to the destination device, and correspondingly, the destination device receives the second Ethernet frame from the second intermediate node through a second interface. It may be understood that the second interface is an interface between the destination device and the second intermediate node. For example, the second intermediate node may send the second Ethernet frame including the second time point to a preconfigured interface, and may further send the second Ethernet frame to the destination device according to a pre-agreed path through the interface.

In this application, the first interface and the second interface may be Ethernet ports having a same specification and/or a same rate. For example, the first interface and the second interface may include but are not limited to one of Ethernet ports whose rates are 100 Mbps, 1 GE, 2.5 GE, 5 GE, 10 GE, or 25 GE.

The first intermediate node and the second intermediate node send the Ethernet frames to the destination device through different paths, and lengths, transmission quality, and the like of the different paths are different. Therefore, the destination device may first receive an Ethernet frame from one of the interfaces, or may simultaneously receive the Ethernet frames from two interfaces. This is not limited in this application. It may be understood that a sequence of performing step 104a and step 104b is not limited in some embodiments of this application. An example in which step 104a is performed before step 104b is used for description below.

Step 105: The destination device first receives the first Ethernet frame from an interface corresponding to the path with a shorter transmission latency, and then may receive the second Ethernet frame from an interface corresponding to the path with a longer transmission latency. Then, the destination device may determine, based on the first time point and the second time point, whether the second Ethernet frame is a duplicate frame of the first Ethernet frame. If determining that the second Ethernet frame is the duplicate frame of the first Ethernet frame, the destination device discards the second Ethernet frame. Alternatively, if determining that the second Ethernet frame is not the duplicate frame of the first Ethernet frame, the destination device stores the second Ethernet frame.

It should be noted that, when the destination device simultaneously receives and processes a plurality of data streams, before receiving the plurality of data streams, the destination device may first identify each data stream on which selective receiving is performed. For example, the data stream is a data stream in the 802.1cb format. The destination device may identify, based on a source MAC address, a VLAN ID, and a destination MAC address in an Ethernet frame included in the data stream, one data stream to be selectively received.

According to the foregoing method, the Ethernet frame does not need to carry a sequence number. The destination device may identify and discard a duplicate frame based on processing time points included in the Ethernet frames received by the two different ports, to implement dual fed and selective receiving, and improve data transmission reliability.

In this application, the destination device may determine, in but not limited to the following two implementations, whether the second Ethernet frame is the duplicate frame of the first Ethernet frame. The following separately describes the two implementations.

In a first implementation, the destination device may determine, based on the first time point, the second time point, and a transmission time interval, whether the second Ethernet frame is the duplicate frame of the first Ethernet frame. The transmission time interval is a transmission time interval between two consecutive Ethernet frames, and the two consecutive Ethernet frames belong to the same data stream of the first Ethernet frame or the second Ethernet frame. It should be noted that the transmission time intervals mentioned in the following all have the same meanings. Based on this example, before determining whether the first Ethernet frame and the second Ethernet frame are duplicate frames, the destination device may obtain the transmission time interval in advance.

Based on the first implementation, in an example, when determining, based on the first time point and the second time point, that an absolute value of a difference between the first time point and the second time point is less than the transmission time interval, the destination device determines that the second Ethernet frame is the duplicate frame of the first Ethernet frame. Alternatively, when determining, based on the first time point and the second time point, that an absolute value of a difference between the first time point and the second time point is greater than or equal to the transmission time interval, the destination device determines that the second Ethernet frame is not the duplicate frame of the first Ethernet frame.

In a second implementation, the destination device may determine, based on the first time point, the second time point, a transmission time interval, and a preset base time point, whether the second Ethernet frame is the duplicate frame of the first Ethernet frame. In this example, before determining whether the first Ethernet frame and the second Ethernet frame are duplicate frames, the destination device may obtain the transmission time interval and the base time point in advance. The base time point may be a sending time point or a frame generation time point of a 1st Ethernet frame that belongs to the same data stream as the first Ethernet frame on the first intermediate node, or a receiving time point of data corresponding to the 1st Ethernet frame on the first intermediate node. Alternatively, the base time point may be a sending time point or a frame generation time point of a 1st Ethernet frame that belongs to the same data stream as the second Ethernet frame on the second intermediate node, or a receiving time point of data corresponding to the 1st Ethernet frame on the second intermediate node.

Based on the second implementation, in an example, the destination device determines a first virtual sequence number corresponding to the first time point based on the first time point, the base time point, and the transmission time interval, and determines a second virtual sequence number corresponding to the second time point based on the second time point, the base time point, and the transmission time interval. If determining that the first virtual sequence number and the second virtual sequence number are the same, the destination device determines that the second Ethernet frame is the duplicate frame of the first Ethernet frame. Alternatively, if determining that the first virtual sequence number and the second virtual sequence number are different, the destination device determines that the second Ethernet frame is not the duplicate frame of the first Ethernet frame.

For example, that the destination device determines a first virtual sequence number corresponding to the first time point based on the first time point, the base time point, and the transmission time interval includes: The destination device determines the first virtual sequence number based on a formula $m+\lfloor(t\_k1-t\_base)/t\_diff\rfloor$. That the destination device determines a second virtual sequence number corresponding to the second time point based on the second time point, the base time point, and the transmission time interval includes: The destination device determines the second virtual sequence number according to a formula $m+\lfloor(t\_k2-t\_base)/t\_diff\rfloor$. m is an integer greater than or equal to 1, $t\_k1$ is the first time point, $t\_k2$ is the second time point, $t\_base$ is the base time point, both $t\_k1$ and $t\_k2$ are greater than $t\_base$, $t\_diff$ is the transmission time interval, and $\lfloor \ \rfloor$ is a round-down operation.

Based on any one of the foregoing possible implementations, the destination device may obtain the transmission time interval locally, or may obtain the transmission time interval from another device. This is not limited in embodiments of this application. If the destination device obtains the transmission time interval locally, before obtaining the transmission time interval, the destination device may generate or determine the transmission time interval in the following manner: The destination device obtains a transmission rate of the data stream and an average length of frames of the data stream, and further determines the transmission time interval based on the transmission rate and the average length. For example, the destination device may determine the transmission time interval according to the following formula: $t\_diff=fl\times8$ bits/r. $t\_diff$ is the transmission time interval, fl is the average length of the frames of the data stream, and r is the transmission rate of the data stream.

The following separately uses two examples to describe the foregoing two implementations.

Example 1: The example is used to describe the first implementation.

When receiving a data stream, the destination device may first identify a data stream to be selectively received. For the data stream to be selectively received, the destination device may obtain a transmission rate r of the data stream and an average length fl of Ethernet frames of the data stream in advance. The transmission time interval t_diff of two consecutive frames is calculated as follows: t_diff=fl×8 bits/r. For example, if r=1 Gbps and fl=1400 bytes, t_diff=1400× 8/1 Gbps=11.2 µs (microseconds).

The destination device may maintain a recent timestamp table recent_ts_table for each data stream to be selectively received. The table stores processing time points included in n Ethernet frames that are not duplicate and that are received by the destination device. The processing time points may be stored in the table in ascending order of time. The processing time point may also be referred to as a timestamp entry. n may be a positive integer, for example, n may be an integer ranging from 0 to 100. After receiving an Ethernet frame carrying a processing time point t_i through one of the first interface and the second interface, the destination device compares the processing time point t_i carried in the Ethernet frame with the processing time points in the recent timestamp table. If a processing time point t_k in the recent timestamp table satisfies that an absolute value of a difference between t_i and t_k is less than t_diff, the destination device may determine that the frame is a duplicate frame, determine that a frame (namely, a frame carrying the processing time point t_k) having the same content as the frame has been received through another interface before, and discard the frame carrying the processing time point t_i. If any processing time point t_j in the recent timestamp table satisfies that an absolute value of a difference between t_i and t_j is greater than or equal to t_diff, the destination device may determine that the frame has not been received and is not a duplicate frame, and the destination device may receive the frame. Further, the destination device may send the frame to an application layer for processing, and may further insert the processing time point ti carried in the frame into a corresponding position in the table in ascending order of time, and discard an earliest (minimum) processing time point in the table.

According to the foregoing method, when the source device does not support a dual fed and selective receiving mechanism with an additional sequence number, the two intermediate nodes may include processing time points in converted Ethernet frames of a same data stream received from the source device. The destination device may identify duplicate frames based on a time difference between the processing time points carried in the Ethernet frames received through the two interfaces, to selectively receive one frame in the duplicate frames. This improves transmission reliability and ensures that the destination device correctly receives one data stream in duplicate data streams, and further improves processing efficiency.

Example 2: The example is used to describe the second implementation.

When receiving a data stream, the destination device may first identify a data stream to be selectively received. For the data stream to be selectively received, the destination device may obtain a transmission rate r of the data stream and an average length fl of Ethernet frames of the data stream in advance. The transmission time interval t_diff of two consecutive frames is calculated as follows: t_diff=fl×8 bits/r. For example, if r=1 Gbps and fl=1400 bytes, t_diff=1400× 8/1 Gbps=11.2 µs (microseconds).

After receiving an Ethernet frame carrying a processing time point through the first interface and/or the second interface, the destination device converts the processing time point into a corresponding virtual sequence number, and may further reuse a protocol stack functional component of 802.1cb to implement a selective receiving function.

Specifically, the destination device may first determine a base time point t_base. For example, the destination device may determine a processing time point f_1 carried in an Ethernet frame first received through one of the interfaces as the base time point, and may determine a virtual sequence number virtual seq num v_seq corresponding to the base time point as 1. For an Ethernet frame f_k carrying a processing time point t_k subsequently received through the first interface or the second interface, a virtual sequence number corresponding to the frame may be determined by using the following formula: virtual seq num v_seq_k=1+⌊(tk−t_base)/t_diff⌋. ⌊ ⌋ is a round-down operation, for example, if (t_k−t_base)/t_diff=5.4, ⌊(tk−t_base)/t_diff⌋=5. Optionally, if virtual seq num v_seq_k≥65535, t_k may be selected as a new base time point t_base, and virtual seq num v_seqk is reset to 1.

Figure 6:
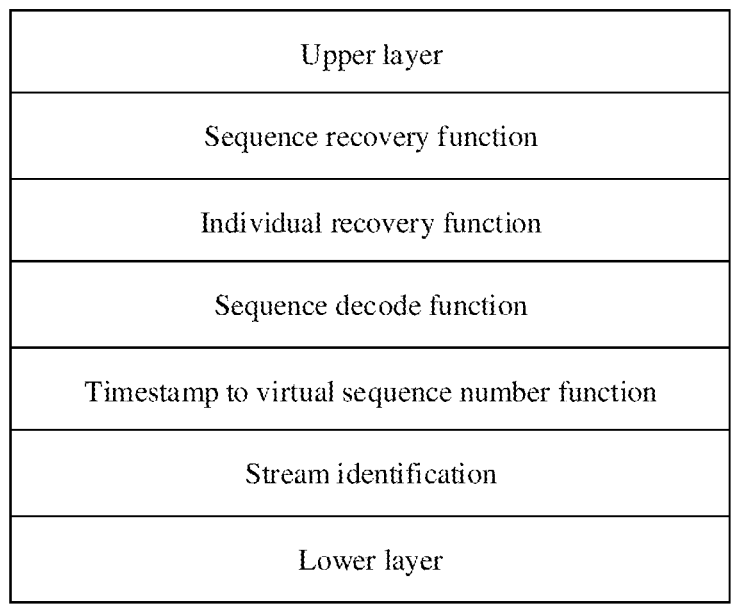
FIG. 6 is a schematic diagram of a protocol stack functional component according to an embodiment of this application.

After converting a processing time point in a received Ethernet frame into a virtual sequence number, the destination device may reuse a protocol stack functional component of 802.1cb to implement a selective receiving function. The destination device may determine whether two frames are duplicate frames based on whether virtual sequence numbers converted from processing time points carried in the received Ethernet frames are the same, to further selectively receive one of the duplicate frames. FIG. 6 is a schematic diagram of reusing a protocol stack functional component of 802.1cb according to an embodiment of this application. An upper layer, a sequence recovery function, an individual recovery function, a sequence decode function, a stream identification, and a lower layer that are included in the component are existing protocol stack functional components of 802.1cb. A timestamp to virtual sequence number function included in the component in FIG. 6 is a new function in an embodiment of this application. Based on the new function, the destination device may convert a timestamp carried in a received Ethernet frame into a virtual sequence number, and processing of the protocol stack functional component of the 802.1cb may continue to be used for processing after the conversion into the virtual sequence number. For example, according to the 802.1cb standard, for a continuous data stream such as a video data stream, a functional unit of the sequence recovery function may be reused in this embodiment. The functional unit of sequence recovery function invokes a vector recovery algorithm to perform selectively receiving on two Ethernet data streams received by the destination device through two interfaces.

According to the foregoing method, not only a same effect as that of the example 1 can be implemented, but also the destination device may reuse a receive side logical functional unit component of 802.1 to implement the selective receiving function, to simplify hardware, reduce logic implementation workload, and reduce implementation complexity. In addition, the destination device can be compatible with the 802.1cb protocol to the greatest extent.

In some embodiments of this application, in a data stream transmission process, an intermediate node fault or a link fault between an intermediate node and the source device may occur. The destination device receives invalid data from the intermediate node within a fault time period, and the destination device processes the invalid data after receiving the invalid data. Consequently, processing resources are wasted. For this problem, this application further provides the following two implementations to overcome the problem. It should be noted that the following two implementations may be implemented in combination with any possible implementation described above.

In a first possible implementation, after receiving the data stream of the source device and converting the data stream into the Ethernet frames, the first intermediate node and the second intermediate node determine a continuity count value for each Ethernet frame, where the corresponding Ethernet frame carries the continuity count value. The continuity count value is used to represent a generation order of the Ethernet frame.

It should be noted that, after the first intermediate node and the second intermediate node convert the data streams received from the source device into the Ethernet frame, a processing procedure for each Ethernet frame is the same. The following uses an example in which the second intermediate node processes the second Ethernet frame in the at least one converted Ethernet frame for description.

In the first possible implementation, the second intermediate node includes a first continuity count value in the second Ethernet frame, where the first continuity count value is used to represent a generation order of the second Ethernet frame on the second intermediate node. For example, if the second Ethernet frame is a 6th Ethernet frame generated by the second intermediate node for the same data stream, the first continuity count value may be 6. If determining, based on the first continuity count value and a second continuity count value, that the second Ethernet frame and a third Ethernet frame are nonconsecutive, the destination device discards the second Ethernet frame and c frames after the second Ethernet frame that are received through a second port. c is an integer greater than or equal to 1, the second continuity count value is a count value included in the third Ethernet frame, the second continuity count value is used to represent a generation order of the third Ethernet frame, and the third Ethernet frame is received before the second Ethernet frame through the second interface.

In some embodiments of this application, the continuity count value may be carried in an existing field of the second Ethernet frame, or may be carried in a newly added field of the second Ethernet frame. This is not limited in embodiments of this application. For example, the continuity count value may be carried in a reserved bit of the second Ethernet frame. For example, the second Ethernet frame is an Ethernet frame in an IEEE 802.1cb format. The continuity count value may be carried in any 12 consecutive bits in the 16 reserved bits of the second Ethernet frame, for example, may be carried in lower 12 bits in the 16 reserved bits. FIG. 7 is a schematic diagram of a modified Ethernet frame in an IEEE 802.1cb format according to an embodiment of this application. In FIG. 7, an example in which a continuity count value is carried in lower 12 bits of 16 reserved bits of the Ethernet frame is used for description.

The following uses an example to describe the first possible implementation.

Figure 8B:
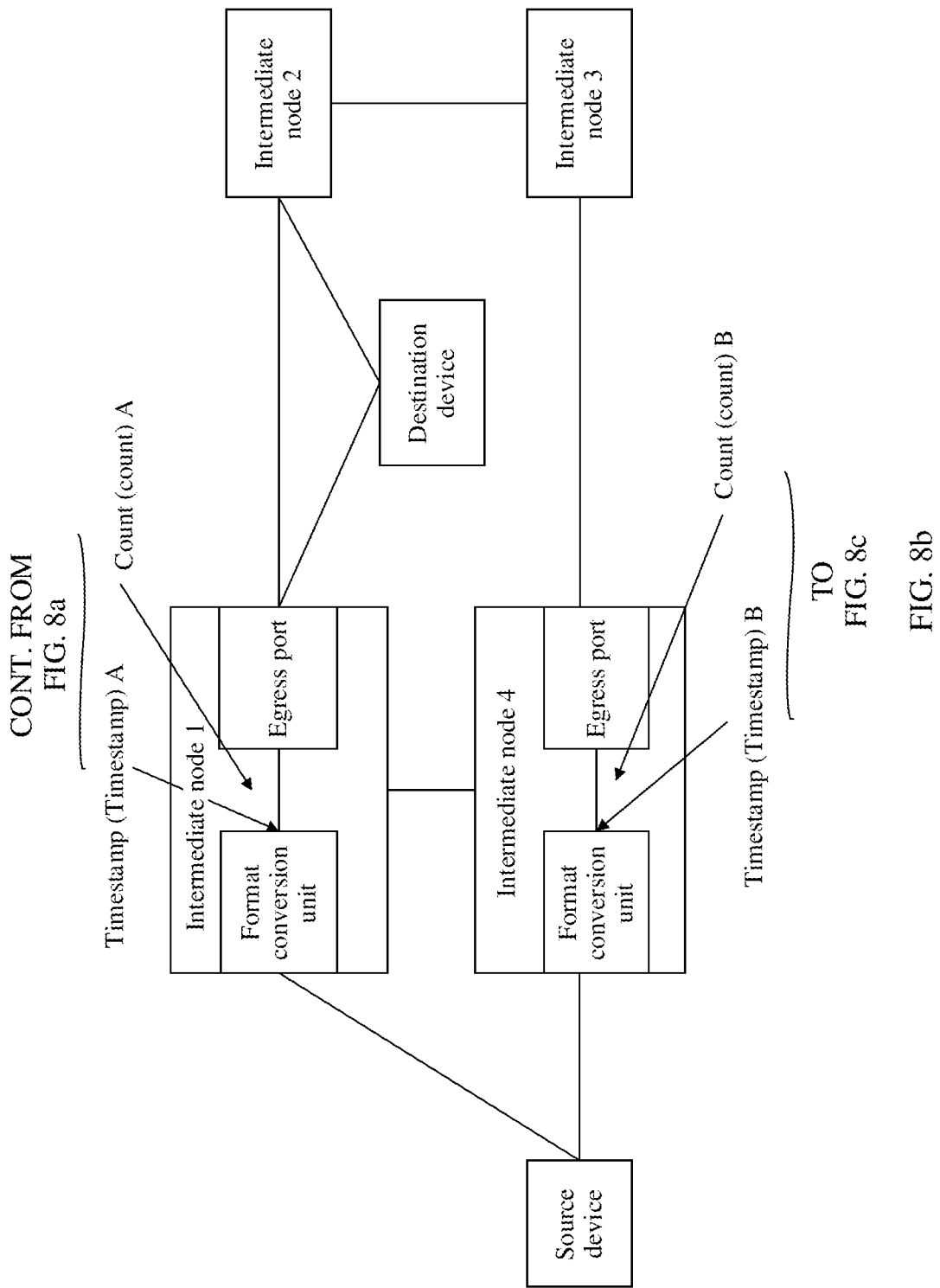

The first intermediate node and the second intermediate node may maintain one local continuity counter for each data stream. Each time several data units of the data stream are received and an Ethernet frame is generated based on the several data units, the continuity counter increases by one, where the Ethernet frame carries a current continuity count value of the continuity counter. Optionally, a count value of the continuity counter may cycle from 1 to 4095. For example, as shown in FIG. 8a to FIG. 8c, an example in which the intermediate node 1 processes the first Ethernet frame in the at least one converted Ethernet frame and the intermediate node 4 processes the second Ethernet frame in the at least one converted Ethernet frame is used for description. The intermediate node 1 determines a timestamp A at which the first Ethernet frame is generated as the processing time point, increases a continuity counter by one after generating the first Ethernet frame, and writes a current count value count A of the continuity counter and the determined processing time point (timestamp A) into the first Ethernet frame. Similarly, the intermediate node 4 determines a timestamp B at which the second Ethernet frame is generated as the processing time point, increases the continuity counter by one after generating the second Ethernet frame, and writes a current count value count B of the continuity counter and the determined processing time point (timestamp B) into the second Ethernet frame. In FIG. 8a to FIG. 8c, an example in which the first Ethernet frame and the second Ethernet frame each is an Ethernet frame in an IEEE 802.1cb format is used for description. The count value may be written into lower 12 bits of a reserved field of the Ethernet frame, and the field is renamed as a continuity count value in FIG. 8a to FIG. 8c. The processing time point may be written into a sequence number field of the Ethernet frame, and the field is renamed as a timestamp in FIG. 8a to FIG. 8c. It should be noted that, after determining a processing time point and a corresponding continuity count value of an Ethernet frame, the intermediate node may immediately write the processing time point and the continuity count value into the Ethernet frame, or may write the processing time point and the continuity count value into the Ethernet frame in subsequent processing. For example, in FIG. 8a to FIG. 8c, after generating a processing time point at the format conversion unit, the intermediate node may write, at the format conversion unit, the processing time point into an Ethernet frame, or may write, at the egress port, the processing time point into the Ethernet frame. Similarly, after generating a corresponding continuity count value, the intermediate node may write, at a generation unit, the continuity count value into the Ethernet frame, or may write, at the egress port, the continuity count value into the Ethernet frame.

If a link between the source device and the intermediate node is faulty or the intermediate node quickly recovers after a transient fault, the intermediate node may reset the local continuity counter, for example, to 1. If a link between the source device and the intermediate node is normal, but the source device does not send data to the intermediate node for a period of time, the intermediate node does not reset the local continuity counter.

Nonconsecutive Frame Discarding Method 1:

After receiving the Ethernet frame carrying the processing time point and the continuity count value through the first interface or the second interface, the destination device records the continuity count value to a latest continuity count last_count associated with the interface. If a continuity count value current_count included in an Ethernet frame subsequently received through the same interface is not equal to last_count plus 1, (or current_count=1 and last_count!=4095), the destination device determines that the Ethernet frame received through the interface is a nonconsecutive frame, and may determine that a transient fault has occurred on a link that is between the intermediate node and the source device and that is on a path associated with the interface or a transient fault has occurred on the intermediate node. In this case, the destination device may discard the Ethernet frame and c subsequent frames of the Ethernet frame that are received through the interface, and select to use c Ethernet frames whose continuity count values are still consecutive and that are received through another interface. Optionally, c may be calculated with reference to a rate r of the data stream, an average frame length fl of the data stream, and based on a typical intermittent link disconnection or transient device fault whose duration does not exceed Is, where c=(r×1)/(fl×8). For example, if the rate r is 1 Gbps and the average frame length fl is 1400 bytes, it can be calculated that c is 89285.

According to the foregoing method, the destination device may identify a case in which a link between the source device and the intermediate node is faulty or the intermediate node quickly recovers after a transient fault, to avoid processing invalid data received through an interface connected to a path on which a fault has occurred. This improves data processing efficiency, and further prevents an intermittent disconnection fault of a single link between the source device to the intermediate node and an intermittent disconnection fault of a single intermediate node, to improve data transmission reliability.

In a second possible implementation, the data stream sent by the source device is a video stream. After receiving the data stream sent by the source device and converting the data stream into the Ethernet frames, the first intermediate node and the second intermediate node obtain a video frame time of a video frame to which video content carried in each Ethernet frame belongs, where the corresponding Ethernet frame carries the video frame time.

It should be noted that, after the first intermediate node and the second intermediate node convert the data streams received from the source device into the Ethernet frame, a processing procedure for each Ethernet frame is the same. The following uses an example in which the second intermediate node processes the second Ethernet frame in the at least one converted Ethernet frame for description.

In the second possible implementation, the second intermediate node includes a first video frame time in the second Ethernet frame, where the first video frame time is a video frame time of a video frame to which video content carried in the second Ethernet frame belongs. If determining that the first video frame time is not equal to a preset value, or determining that a difference between the first video frame time and a second video frame time is not equal to the preset value, the destination device discards the second Ethernet frame and c frames after the second Ethernet frame that are received through the second port. c is an integer greater than or equal to 1, the second video frame time is a video frame time of a video frame to which video content carried in a fourth Ethernet frame belongs, and the fourth Ethernet frame is received before the second Ethernet frame through the second interface. The preset value may be related to a sampling frequency used by the video stream. For example, if the video stream uses a sampling frequency of 30 fps (frame per second), the preset value may be 33.3 ms.

In some embodiments of this application, the video frame time may be carried in an existing field of the second Ethernet frame, or may be carried in a newly added field of the second Ethernet frame. This is not limited in embodiments this application. For example, the video frame time may be carried in a reserved bit of the second Ethernet frame. For example, the second Ethernet frame is an Ethernet frame in an IEEE 802.1cb format. Lower 12 bits of the video frame time may be carried in any 12 consecutive bits in the 16 reserved bits of the second Ethernet frame, for example, may be carried in lower 12 bits in the 16 reserved bits. FIG. 9 is a schematic diagram of a modified Ethernet frame in an IEEE 802.1cb format according to an embodiment of this application. In FIG. 9, an example in which the lower 12 bits of the video frame time are carried in lower 12 bits of 16 reserved bits of the Ethernet frame is used for description.

The following uses an example to describe the second possible implementation.

Figure 10A:
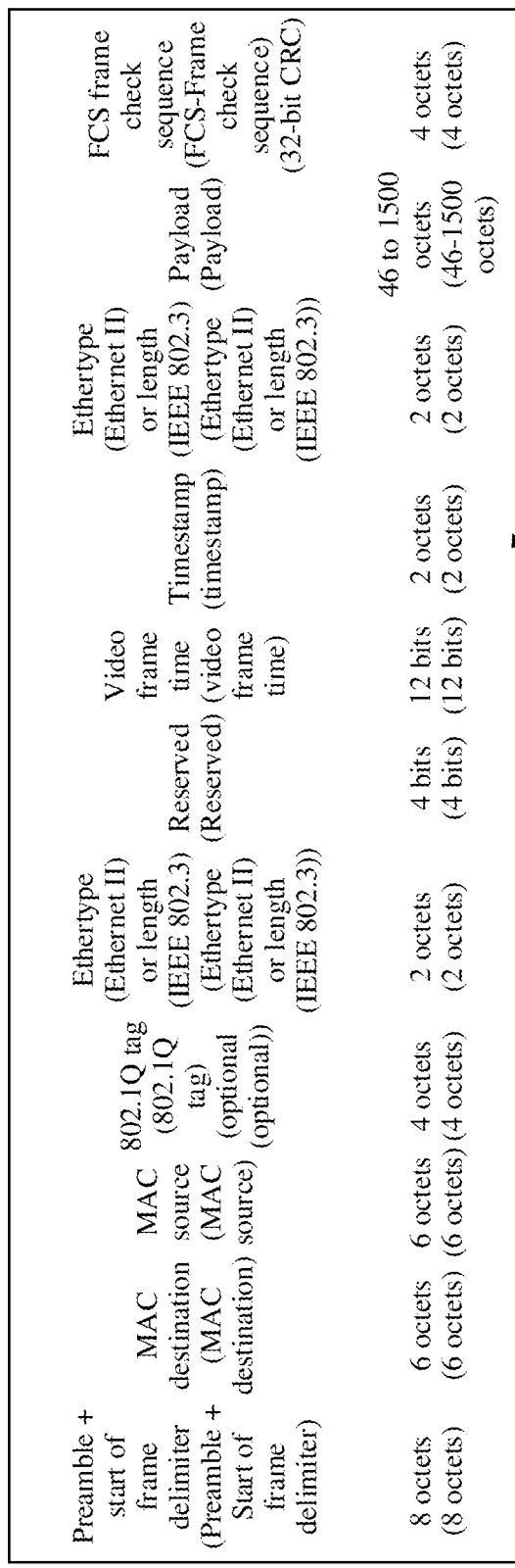
Figure 10C:

In the example, the data stream sent by the source device is the video stream. After receiving the video stream sent by the source device, the first intermediate node and the second intermediate node each extracts a video frame time from the video stream when the video stream is converted to an Ethernet data stream, and convert the video stream into at least one Ethernet frame. A video frame time of a video frame to which video content carried in each Ethernet frame belongs is carried in the corresponding Ethernet frame. For example, as shown in FIG. 10a to FIG. 10c, an example in which the intermediate node 1 processes the first Ethernet frame in the at least one converted Ethernet frame and the intermediate node 4 processes the second Ethernet frame in the at least one converted Ethernet frame is used for description. The intermediate node 1 determines a timestamp A at which the first Ethernet frame is generated as the processing time point, extracts a video frame time vf_timeA of a video frame to which video content carried in the first Ethernet frame belongs, and writes the video frame time vf_timeA and the processing time point (timestamp A) into the first Ethernet frame. Similarly, the intermediate node 4 determines a timestamp B at which the second Ethernet frame is generated as the processing time point, extracts a video frame time vf_timeB of a video frame to which the video content carried in the second Ethernet frame belongs, and writes the video frame time vf_timeB and the processing time point (timestamp B) into the second Ethernet frame. In FIG. 10a to FIG. 10c, an example in which the first Ethernet frame and the second Ethernet frame each is an Ethernet frame in an IEEE 802.1cb format is used for description. Lower 12 bits of the video frame time may be written into lower 12 bits of a reserved field of the Ethernet frame, and the field is renamed as a video frame time in FIG. 10a to FIG. 10c. The processing time point may be written into a sequence number field of the Ethernet frame, and the field is renamed as a timestamp in FIG. 10a to FIG. 10c. It should be noted that, after determining a processing time point and a corresponding video frame time of an Ethernet frame, the intermediate node may immediately write the processing time point and the video frame time into the Ethernet frame, or may write the processing time point and the video frame time into the Ethernet frame in subsequent processing. For example, in FIG. 10a to FIG. 10c, after generating a processing time point at the format conversion unit, the intermediate node may write, at the format conversion unit, the processing time point into an Ethernet frame, or may write, at the egress port, the processing time point into the Ethernet frame. Similarly, after obtaining a corresponding video frame time, the intermediate node may write, at an obtaining unit, the video frame time into the Ethernet frame, or may write, at the egress port, the video frame time into the Ethernet frame.

Nonconsecutive Frame Discarding Method 2:

After receiving the Ethernet frame carrying the processing time point and the video frame time through the first interface or the second interface, the destination device records the video frame time to a latest video frame time last vf time associated with the interface. If a video frame time included in an Ethernet frame subsequently received through the same interface is not equal to the preset value, the destination device determines that the Ethernet frame received by the interface is a nonconsecutive frame and may determine that a transient fault has occurred on a link that is between the intermediate node and the source device and that is on a path associated with the interface or a transient fault has occurred on the intermediate node. In this case, the destination device may discard the Ethernet frame and c subsequent frames of the Ethernet frame that are received through the interface, and select to use c Ethernet frames whose continuity count values are still consecutive and that are received through another interface. Optionally, c may be calculated with reference to a rate r of the data stream, an average frame length fl of the data stream, and based on a typical intermittent link disconnection or transient device fault whose duration does not exceed 1s, where c=(r×1)/(fl× 8). For example, if the rate r is 1 Gbps and the average frame length fl is 1400 bytes, it can be calculated that c is 89285.

According to the foregoing method, the destination device may identify a case in which a link between the source device and the intermediate node is faulty or the intermediate node quickly recovers after a transient fault, to avoid processing invalid data received through an interface connected to a path on which a fault has occurred. This improves data processing efficiency, and further prevents an intermittent disconnection fault of a single link between the source device to the intermediate node and an intermittent disconnection fault of a single intermediate node, to improve data transmission reliability. Compared with the nonconsecutive frame discarding method 1, in this method, there is no need to maintain an additional continuity counter is required, and only a video frame time needs to be extracted from a received data stream and recorded into an extended Ethernet frame. Implementation complexity of a chip and related software is lower.

The foregoing mainly describes the solutions provided in this application from a perspective of interaction between the source device, the intermediate node, and the destination device. It may be understood that, to implement the foregoing functions, the source device, the intermediate node, or the destination device may include a corresponding hardware structure and/or software module for performing the functions. A person skilled in the art should easily be aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the intermediate node and the destination device may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit.

Based on a same inventive concept, the embodiments of this application further provide an apparatus configured to implement any one of the foregoing methods. For example, an apparatus is provided, and includes units (or means) configured to implement the steps performed by the destination device in any one of the foregoing methods. In another example, another apparatus is further provided, and includes units (or means) configured to implement the steps performed by the intermediate node in any one of the foregoing methods.

Figure 11:
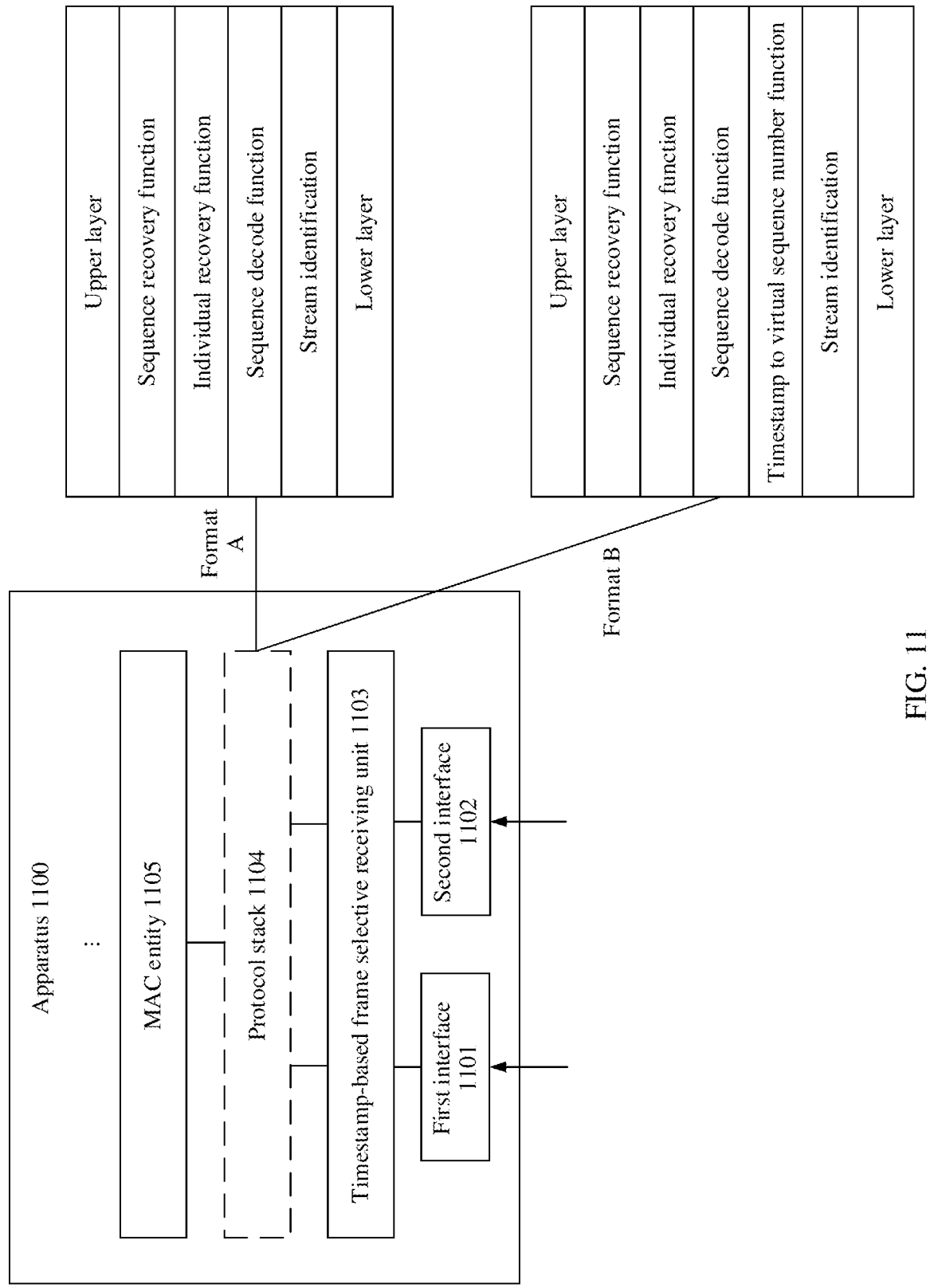
FIG. 11 is a schematic diagram of a structure of an apparatus according to an embodiment of this application.

FIG. 11 is a schematic diagram of a structure of a frame processing apparatus according to an embodiment of this application. The apparatus 1100 may exist in a form of software or hardware. The apparatus 1100 may be the destination device in any one of the foregoing embodiments, or may be a semiconductor chip disposed in the destination device. The apparatus 1100 may include a first interface 1101, a second interface 1102, and a timestamp-based frame selective receiving unit 1103. Optionally, the apparatus 1100 may further include a protocol stack 1104, a MAC entity 1105, and the like. The first interface 1101 is configured to send and receive a signal. For example, the first interface 1101 may be configured to perform step 104a in FIG. 3. The second interface 1102 is configured to send and receive a signal. For example, the second interface 1102 may be configured to perform step 104b in FIG. 3. The timestamp-based frame selective receiving unit 1103 is configured to determine whether a received frame is a duplicate frame. For example, the timestamp-based frame selective receiving unit 1103 may be configured to perform step 105 in FIG. 3. The first interface 1101 and the second interface 1102 may include but are not limited to one of Ethernet ports whose rates are 100 Mbps, 1 GE, 2.5 GE, 5 GE, 10 GE, or 25 GE. A specific format of the protocol stack 1104 may be a format A or a format B.

In a possible implementation, the first time point is a sending time point of the first Ethernet frame on the first intermediate node, and the second time point is a sending time point of the second Ethernet frame on the second intermediate node. Alternatively, the first time point is a frame generation time point of the first Ethernet frame on the first intermediate node, and the second time point is a frame generation time point of the second Ethernet frame on the second intermediate node. Alternatively, the first time point is a receiving time point of data corresponding to the first Ethernet frame on the first intermediate node, and the second time point is a receiving time point of data corresponding to the second Ethernet frame on the second intermediate node.

In a possible implementation, the timestamp-based frame selective receiving unit 1103 may be further configured to:
before the destination device determines, based on the first time point and the second time point, whether the second Ethernet frame is a duplicate frame of the first Ethernet frame, obtain a transmission time interval. The transmission time interval is a transmission time interval between two consecutive Ethernet frames, and the two consecutive Ethernet frames belong to a same data stream of the first Ethernet frame or the second Ethernet frame.

In a possible implementation, the timestamp-based frame selective receiving unit 1103 may be further configured to obtain a preset base time point.

In a possible implementation, the timestamp-based frame selective receiving unit 1103 is further configured to: when determining, based on the first time point and the second time point, that an absolute value of a difference between the first time point and the second time point is less than the transmission time interval, determine that the second Ethernet frame is the duplicate frame of the first Ethernet frame; or when determining, based on the first time point and the second time point, that an absolute value of a difference between the first time point and the second time point is greater than or equal to the transmission time interval, determine that the second Ethernet frame is not the duplicate frame of the first Ethernet frame.

In a possible implementation, the timestamp-based frame selective receiving unit 1103 is further configured to: determine a first virtual sequence number corresponding to the first time point based on the first time point, the base time point, and the transmission time interval; determine a second virtual sequence number corresponding to the second time point based on the second time point, the base time point, and the transmission time interval; and if determining that the first virtual sequence number and the second virtual sequence number are the same, determine that the second Ethernet frame is the duplicate frame of the first Ethernet frame; or if determining that the first virtual sequence number and the second virtual sequence number are different, determine that the second Ethernet frame is not the duplicate frame of the first Ethernet frame.

In a possible implementation, the timestamp-based frame selective receiving unit 1103 is further configured to determine the first virtual sequence number according to a formula $m+\lfloor(t\_k1-T\_base)/t\_diff\rfloor$, and determine the second virtual sequence number according to a formula $m+\lfloor(t\_k2-t\_base)/t\_diff\rfloor$. m is an integer greater than or equal to 1, t_k1 is the first time point, t_k2 is the second time point, t_base is the base time point, both t_k1 and t_k2 are greater than t_base, t_diff is the transmission time interval, and $\lfloor\ \rfloor$ is a round-down operation.

In a possible implementation, the base time point is a sending time point or a frame generation time point of a 1st Ethernet frame that belongs to the same data stream as the first Ethernet frame on the first intermediate node, or a receiving time point of data corresponding to the 1st Ethernet frame on the first intermediate node. Alternatively, the base time point is a sending time point or a frame generation time point of a 1st Ethernet frame that belongs to the same data stream as the second Ethernet frame on the second intermediate node, or a receiving time point of data corresponding to the 1st Ethernet frame on the second intermediate node.

In a possible implementation, the second Ethernet frame further includes a first continuity count value, and the first continuity count value is used to represent a generation order of the second Ethernet frame. Based on this implementation, the timestamp-based frame selective receiving unit 1103 may be further configured to: if determining, based on the first continuity count value and a second continuity count value, that the second Ethernet frame and a third Ethernet frame are nonconsecutive, discard the second Ethernet frame and n frames after the second Ethernet frame that are received through a second port. n is an integer greater than or equal to 1, the second continuity count value is a count value included in the third Ethernet frame, the second continuity count value is used to represent a generation order of the third Ethernet frame, and the third Ethernet frame is a frame received before the second Ethernet frame through the second interface.

In a possible implementation, the second Ethernet frame further includes a first video frame time, and the first video frame time is a video frame time of a video frame to which video content carried in the second Ethernet frame belongs. Based on this implementation, the timestamp-based frame selective receiving unit 1103 may be further configured to: if determining that the first video frame time is not equal to a preset value, or determining that a difference between the first video frame time and a second video frame time is not equal to the preset value, discard the second Ethernet frame and n frames after the second Ethernet frame that are received through the second port. n is an integer greater than or equal to 1, the second video frame time is a video frame time of a video frame to which video content carried in a fourth Ethernet frame belongs, and the fourth Ethernet frame is received before the second Ethernet frame through the second interface.

In a possible implementation, the timestamp-based frame selective receiving unit 1103 may be further configured to: if determining that the second Ethernet frame is the duplicate frame of the first Ethernet frame, discard the second Ethernet frame; or if determining that the second Ethernet frame is not the duplicate frame of the first Ethernet frame, store the second Ethernet frame.

In a possible implementation, lower k bits at the first time point are carried in a sequence number field included in the first Ethernet frame; and/or low k bits at the second time point are carried in a sequence number field included in the second Ethernet frame, and k is a positive integer less than or equal to 16.

In a possible implementation, a local clock of the first intermediate node is synchronized with a local clock of the second intermediate node.

In a possible implementation, time precision of the time point reaches at least a 100-nanosecond ns level.

Figure 12:
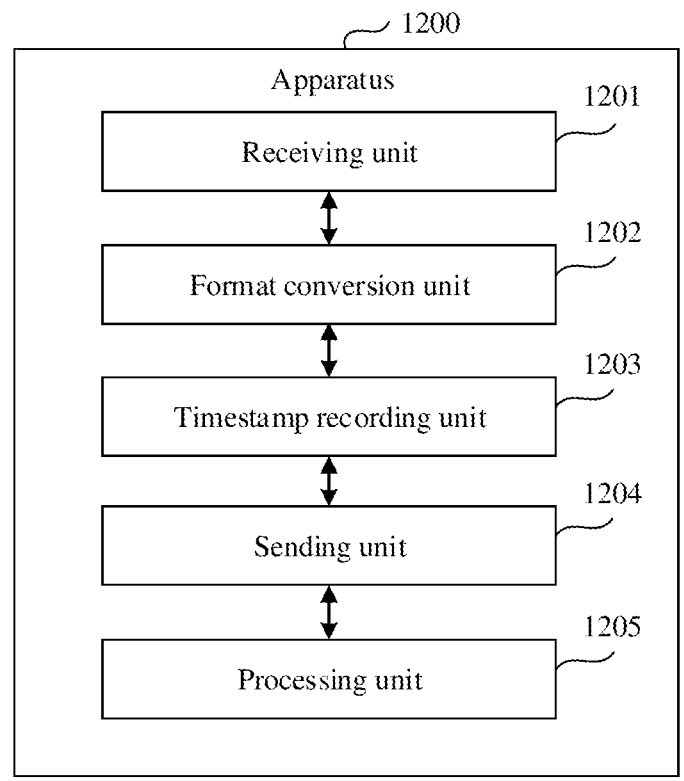
FIG. 12 is a schematic diagram of a structure of another apparatus according to an embodiment of this application.

FIG. 12 is a schematic diagram of a structure of a frame processing apparatus according to an embodiment of this application. The apparatus 1200 may exist in a form of software or hardware. The apparatus 1200 may be the first intermediate node or the second intermediate node in any one of the foregoing embodiments, or may be a semiconductor chip disposed in the first intermediate node or the second intermediate node. The apparatus 1200 may include a receiving unit 1201, a format conversion unit 1202, a timestamp recording unit 1203, and a sending unit 1204. The receiving unit 1201 is configured to receive a signal. For example, the receiving unit 1201 may be configured to perform step 101 in FIG. 3. The format conversion unit 1202 is configured to perform format conversion on a received data stream. For example, the format conversion unit 1202 may be configured to perform step 102*a* or step 102*b* in FIG. 3. The timestamp recording unit 1203 is configured to determine a processing time point of the Ethernet frame converted by the format conversion unit 1202. For example, the timestamp recording unit 1203 may be configured to perform step 103*a* or step 103*b* in FIG. 3. The sending unit 1204 is configured to send a signal. For example, the sending unit 1204 may be configured to perform step 104*a* or step 104*b* in FIG. 3.

In a possible implementation, the time point is a sending time point of the Ethernet frame on the intermediate node, the time point is a frame generation time point of the Ethernet frame on the intermediate node, or the time point is a receiving time point of data corresponding to the Ethernet frame on the intermediate node.

In a possible implementation, the non-Ethernet protocol includes any one of the following protocols: a low-voltage differential signal (LVDS) transmission protocol, a gigabit multimedia serial link (GMSL) transmission protocol, or a control area network (CAN) transmission protocol.

In a possible implementation, the apparatus 1200 further includes a processing unit 1205. The processing unit 1205 may be configured to: determine a continuity count value of each Ethernet frame, where the corresponding Ethernet frame carries the continuity count value, and the continuity count value is used to represent a generation order of the Ethernet frame.

In a possible implementation, the data stream is a video stream. Based on this implementation, the processing unit 1205 may be further configured to: obtain a video frame time of a video frame to which video content carried in each Ethernet frame belongs, where the corresponding Ethernet frame carries the video frame time.

In a possible implementation, lower k bits at the time point are carried in a sequence number field included in the Ethernet frame, and k is a positive integer less than or equal to 16.

In a possible implementation, time precision of the time point reaches at least a 100-nanosecond ns level.

It should be understood that division into the units in the foregoing apparatuses is merely logical function division. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing method or the foregoing units may be implemented by using a hardware integrated logic circuit in the processing element, or may be implemented in a form of software invoked by the processing element.

In an example, a unit in any one of the foregoing apparatuses may be one or more integrated circuits configured to implement the foregoing methods, for example, one or more specific integrated circuits (application specific integrated circuit, ASIC), one or more microprocessors (digital signal processor, DSP), one or more field programmable gate arrays (FPGA), or a combination of at least two of the integrated circuits. In another example, when a unit in the apparatus is implemented by scheduling a program by a processing element, the processing element may be a general-purpose processor, for example, a central processing unit (CPU) or another processor that can invoke the program. In still another example, the units may be integrated and implemented in a form of a system-on-a-chip (SOC).

The foregoing unit or interface for receiving is an interface circuit of the apparatus, configured to receive a signal from another apparatus. For example, when the apparatus is implemented in a form of a chip, the receiving unit or interface is an interface circuit that is of the chip and that is configured to receive a signal from another chip or apparatus. The foregoing unit or interface for sending is an interface circuit of the apparatus, configured to send a signal to another apparatus. For example, when the apparatus is implemented in a form of a chip, the sending unit or interface is an interface circuit that is of the chip and that is configured to send a signal to another chip or apparatus.

Figure 13:
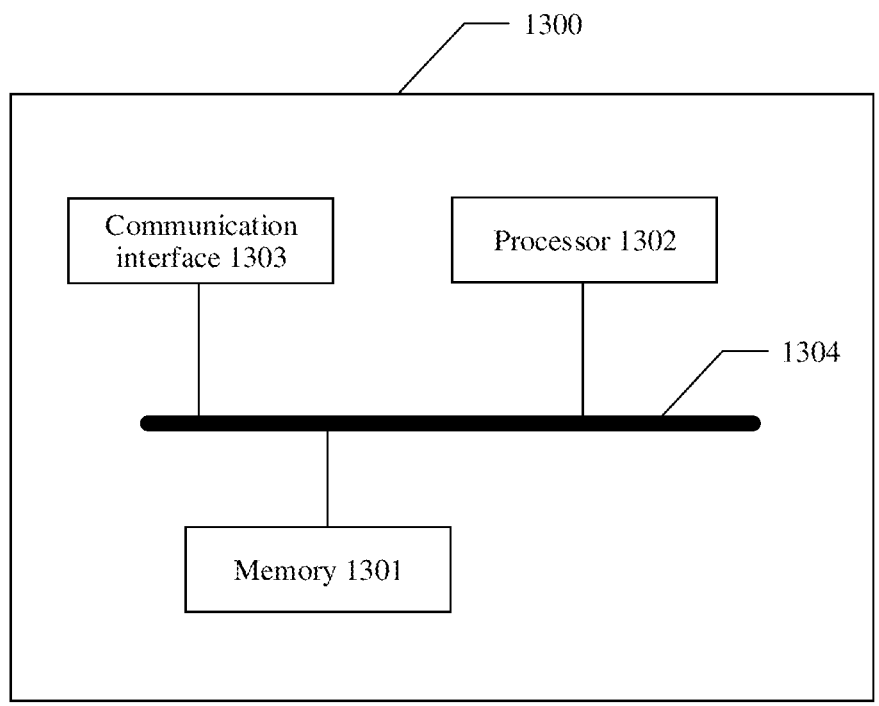
FIG. 13 is a schematic diagram of a structure of still another apparatus according to an embodiment of this application.

FIG. 13 is a schematic diagram of an apparatus according to an embodiment of this application. The apparatus may be the source device, the intermediate node, or the destination device in the foregoing embodiments. The apparatus 1300 includes a processor 1302, a communication interface 1303, and a memory 1301. Optionally, the apparatus 1300 may further include a bus 1304. The communication interface 1303, the processor 1302, and the memory 1301 may be connected to each other through the bus 1304. The bus 1304 may be a peripheral component interconnect (PCI for short) bus, an extended industry standard architecture (EISA for short) bus, or the like. The bus 1304 may be classified into an address bus, a data bus, a control bus, and the like. For ease of representation, only one thick line is used to represent the bus in FIG. 13, but this does not mean that there is only one bus or only one type of bus.

The processor 1302 may be a CPU, a microprocessor, an ASIC, or one or more integrated circuits configured to control program execution in the solutions of this application.

The communication interface 1303 is configured to communicate with another device or a communication network, such as the Ethernet, a RAN, a wireless local area network (WLAN), or a wired access network via any apparatus such as a transceiver.

The memory 1301 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a disk storage medium or another magnetic storage device, or any other medium capable of carrying or storing desired program code in a form of an instruction or a data structure and capable of being accessed by a computer, but is not limited thereto. The memory may exist independently, and is connected to the processor through the bus 1304. The memory may alternatively be integrated with the processor.

The memory 1301 is configured to store computer-executable instructions for executing the solutions in this application, and the processor 1302 controls the execution. The processor 1302 is configured to execute the computer-executable instructions stored in the memory 1301, to implement the method provided in the foregoing embodiments of this application.

Optionally, the computer-executable instructions in some embodiments of this application may also be referred to as application program code. This is not specifically limited in some embodiment of this application.

Based on a same concept as the foregoing method embodiments, an embodiment of this application further provides a computer-readable storage medium, storing some instructions. When these instructions are invoked and executed by a computer, the computer may be enabled to complete the method according to any one of the foregoing method embodiments or the possible designs of the foregoing method embodiments. In some embodiments of this application, the computer-readable storage medium is not limited. For example, the computer-readable storage medium may be a RAM (random access memory) or a ROM (read-only memory).

Based on a same concept as the foregoing method embodiments, this application further provides a computer program product. When being invoked and executed by a computer, the computer program product can complete the method according to any one of the foregoing method embodiments and the possible designs of the foregoing method embodiments.

Based on a same concept as the foregoing method embodiments, this application further provides a chip. The chip may include a processor and an interface circuit, and is configured to complete the method in any one of the foregoing method embodiments and the possible implementations of the method embodiments. "Coupling" means that two components are directly or indirectly combined with each other. The combination may be fixed or movable, and the combination may allow communication of a fluid, electricity, an electrical signal, or another type of signal between the two parts.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the processes or functions according to the embodiments of the present invention are completely or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor can read information from the storage medium and write information to the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although the present invention is described with reference to specific features and the embodiments thereof, it is clear that various modifications and combinations may be made to them without departing from the scope of the present invention. Correspondingly, the specification and the accompanying drawings are merely example description of the present invention defined by the appended claims, and are considered as any of or all modifications, variations, combinations or equivalents that cover the scope of the present invention. Definitely, a person skilled in the art can make various modifications and variations to the present invention without departing from the scope of the present invention. The present invention is intended to cover these modifications and variations of the present invention provided that these modifications and variations fall within the scope of the claims of the present invention and equivalent technologies thereof.

What is claimed is:

1. A frame processing method, comprising:
   receiving, by a destination device, a first Ethernet frame from a first intermediate node through a first interface, wherein the first Ethernet frame comprises a first time point, and the first time point is a processing time point of the first Ethernet frame on the first intermediate node;
   receiving, by the destination device, a second Ethernet frame from a second intermediate node through a second interface, wherein the second Ethernet frame comprises a second time point, and the second time point is a processing time point of the second Ethernet frame on the second intermediate node;
   obtaining, by the destination device, a transmission time interval, wherein the transmission time interval is a transmission time interval between two consecutive Ethernet frames, and the two consecutive Ethernet frames belong to a same data stream of the first Ethernet frame or the second Ethernet frame; and
   after obtaining the transmission time interval, determining, by the destination device based on the first time point, the second time point, and the transmission time interval, whether the second Ethernet frame is a duplicate frame of the first Ethernet frame.

2. The method according to claim 1, wherein the first time point is a sending time point at which the first Ethernet frame is sent on the first intermediate node, and the second time point is a sending time point at which the second Ethernet frame is sent on the second intermediate node;
   the first time point is a frame generation time point at which the first Ethernet frame is generated on the first intermediate node, and the second time point is a frame generation time point at which the second Ethernet frame is generated on the second intermediate node; or the first time point is a receiving time point at which data corresponding to the first Ethernet frame is received on the first intermediate node, and the second time point is a receiving time point at which data corresponding to the second Ethernet frame is received on the second intermediate node.

3. The method according to claim 1, further comprising: obtaining, by the destination device, a base time point.

4. The method according to claim 3, wherein the determining, by the destination device based on the first time point and the second time point, whether the second Ethernet frame is a duplicate frame of the first Ethernet frame comprises:

determining, by the destination device, a first virtual sequence number corresponding to the first time point based on the first time point, the base time point, and the transmission time interval;

determining, by the destination device, a second virtual sequence number corresponding to the second time point based on the second time point, the base time point, and the transmission time interval;

upon determining that the first virtual sequence number and the second virtual sequence number are the same, determining, by the destination device, that the second Ethernet frame is the duplicate frame of the first Ethernet frame; and upon determining that the first virtual sequence number and the second virtual sequence number are different, determining, by the destination device, that the second Ethernet frame is not the duplicate frame of the first Ethernet frame.

5. The method according to claim 4, wherein the determining, by the destination device, a first virtual sequence number corresponding to the first time point based on the first time point, the base time point, and the transmission time interval comprises:

determining, by the destination device, the first virtual sequence number according to a formula $m+\lfloor(t\_k1-t\_base)/t\_diff\rfloor$; and the determining, by the destination device, a second virtual sequence number corresponding to the second time point based on the second time point, the base time point, and the transmission time interval comprises:

determining, by the destination device, the second virtual sequence number according to a formula $m+\lfloor(t\_k2-t\_base)/t\_diff\rfloor$, wherein m is an integer greater than or equal to 1, $t\_k1$ is the first time point, $t\_k2$ is the second time point, $t\_base$ is the base time point, both $t\_k1$ and $t\_k2$ are greater than $t\_base$, $t\_diff$ is the transmission time interval, and $\lfloor\ \rfloor$ is a round-down operation.

6. The method according to claim 3, wherein the base time point is a sending time point at which a 1st Ethernet frame that belongs to the same data stream as the first Ethernet frame is sent on the first intermediate node, a frame generation time point at which the 1st Ethernet frame is generated or a receiving time point at which data corresponding to the 1st Ethernet frame is received on the first intermediate node; or the base time point is a sending time point at which a 1st Ethernet frame that belongs to the same data stream as the second Ethernet frame is sent on the second intermediate node, or a frame generation time point at which the 1st Ethernet frame is generated, or a receiving time point at which data corresponding to the 1st Ethernet frame is received on the second intermediate node.

7. The method according to claim 1, wherein the determining, by the destination device based on the first time point and the second time point, whether the second Ethernet frame is a duplicate frame of the first Ethernet frame comprises:

upon determining that an absolute value of a difference between the first time point and the second time point is less than the transmission time interval, determining, by the destination device, that the second Ethernet frame is the duplicate frame of the first Ethernet frame; or upon determining that an absolute value of a difference between the first time point and the second time point is greater than or equal to the transmission time interval, determining, by the destination device, that the second Ethernet frame is not the duplicate frame of the first Ethernet frame.

8. The method according to claim 1, wherein the second Ethernet frame further comprises a first continuity count value, and the first continuity count value represents a generation order of the second Ethernet frame; and the method further comprises:

upon determining, based on the first continuity count value and a second continuity count value, that the second Ethernet frame and a third Ethernet frame are nonconsecutive, discarding, by the destination device, the second Ethernet frame and n frames after the second Ethernet frame that are received through a second port, wherein n is an integer greater than or equal to 1, the second continuity count value is comprised in the third Ethernet frame, the second continuity count value represent a generation order of the third Ethernet frame, and the third Ethernet frame is received before the second Ethernet frame through the second interface.

9. The method according to claim 1, wherein the obtaining of the transmission time interval comprises:

obtaining a transmission rate of the data stream to which the two consecutive Ethernet frames belong and an average length of frames of the data stream, and determining the transmission time interval based on the transmission rate and the average length of frames of the data stream.

10. The method according to claim 9, wherein the determining of the transmission time interval based on the transmission rate and the average length of frames of the data stream comprises:

determining the transmission time interval according to a formula: $t\_diff=fl\times8\ bits/r$, wherein $t\_diff$ is the transmission time interval, fl is the average length of the frames of the data stream, and r is the transmission rate of the data stream.

11. A frame processing method, comprising:

receiving, by an intermediate node, a data stream from a source device, wherein the data stream is transmitted by using a non-Ethernet protocol;

converting, by the intermediate node, the data stream into at least one Ethernet frame;

determining, by the intermediate node, a processing time point of each of the at least one Ethernet frame, wherein the Ethernet frame carries the processing time point; and sending, by the intermediate node, the Ethernet frame carrying the processing time point to a destination device, so that the destination device determines whether the Ethernet frame is duplicate of another Ethernet frame received from another intermediate node, based on the processing time point, another processing time point of said another Ethernet frame, and a transmission time interval, wherein the transmission time interval is a transmission time interval between two consecutive Ethernet frames, and the two consecutive Ethernet frames belong to a same data stream of the Ethernet frame or said another Ethernet frame.

12. The method according to claim 11, wherein the processing time point is a sending time point at which the Ethernet frame is sent on the intermediate node, a frame generation time point at which the Ethernet frame is generated on the intermediate node, or a receiving time point at which data corresponding to the Ethernet frame is received on the intermediate node.

13. The method according to claim 11, wherein the non-Ethernet protocol comprises any one of:
a low-voltage differential signal (LVDS) transmission protocol, a gigabit multimedia serial link (GMSL) transmission protocol, or a control area network (CAN) transmission protocol.

14. The method according to claim 11, further comprising:
determining, by the intermediate node, a continuity count value of each of the at least one Ethernet frame, wherein the Ethernet frame carries the continuity count value, and the continuity count value represents a generation order of the Ethernet frame.

15. The method according to claim 11, wherein the data stream is a video stream; and
the method further comprises:
obtaining, by the intermediate node, a video frame time of a video frame to which video content carried in each of the at least one Ethernet frame belongs, wherein the Ethernet frame carries the video frame time.

16. A frame processing apparatus, comprising:
one or more processors; and
a non-transitory computer-readable memory storing a program to be executed by the one or more processors, the program including instructions that, when executed by the one or more processors, cause the frame processing apparatus to:
receive a first Ethernet frame from a first intermediate node through a first interface, wherein the first Ethernet frame comprises a first time point, and the first time point is a processing time point of the first Ethernet frame on the first intermediate node;
receive a second Ethernet frame from a second intermediate node through a second interface, wherein the second Ethernet frame comprises a second time point, and the second time point is a processing time point of the second Ethernet frame on the second intermediate node;
obtain a transmission time interval, wherein the transmission time interval is a transmission time interval between two consecutive Ethernet frames, and the two consecutive Ethernet frames belong to a same data stream of the first Ethernet frame or the second Ethernet frame; and
after obtaining the transmission time interval, determine, based on the first time point, the second time point, and the transmission time interval, whether the second Ethernet frame is a duplicate frame of the first Ethernet frame.

17. The apparatus according to claim 16, wherein the first time point is a sending time point at which the first Ethernet frame is sent on the first intermediate node, and the second time point is a sending time point at which the second Ethernet frame is sent on the second intermediate node;
the first time point is a frame generation time point at which the first Ethernet frame is generated on the first intermediate node, and the second time point is a frame generation time point at which the second Ethernet frame is generated on the second intermediate node; or
the first time point is a receiving time point at which data corresponding to the first Ethernet frame is received on the first intermediate node, and the second time point is a receiving time point at which data corresponding to the second Ethernet frame is received on the second intermediate node.

18. The apparatus according to claim 16, wherein the program further comprises instructions that cause the apparatus to obtain a base time point.

19. The apparatus according to claim 18, wherein determining whether the second Ethernet frame is a duplicate frame of the first Ethernet frame comprises:
upon determining that an absolute value of a difference between the first time point and the second time point is less than the transmission time interval, determining, that the second Ethernet frame is the duplicate frame of the first Ethernet frame; and
upon determining that an absolute value of a difference between the first time point and the second time point is greater than or equal to the transmission time interval, determining that the second Ethernet frame is not the duplicate frame of the first Ethernet frame.

20. The apparatus according to claim 19, wherein determining whether the second Ethernet frame is a duplicate frame of the first Ethernet frame comprises:
determining a first virtual sequence number corresponding to the first time point based on the first time point, the base time point, and the transmission time interval;
determining a second virtual sequence number corresponding to the second time point based on the second time point, the base time point, and the transmission time interval;
upon determining that the first virtual sequence number and the second virtual sequence number are the same, determining that the second Ethernet frame is the duplicate frame of the first Ethernet frame; and
upon determining that the first virtual sequence number and the second virtual sequence number are different, determining that the second Ethernet frame is not the duplicate frame of the first Ethernet frame.

* * * * *

UNITED STATES PATENT AND TRADEMARK OFFICE
CERTIFICATE OF CORRECTION

PATENT NO. : 11,824,657 B2  
APPLICATION NO. : 17/680525  
DATED : November 21, 2023  
INVENTOR(S) : Min Zha et al.

Page 1 of 1

It is certified that error appears in the above-identified patent and that said Letters Patent is hereby corrected as shown below:

In the Specification

Column 21, Line 36, change "ti" to "t_i";

Column 25, Line 7, change "Is" to "1s"; and

Column 27, Line 14, change "Is" to "1s".

Signed and Sealed this  
Twenty-sixth Day of December, 2023

Katherine Kelly Vidal  
*Director of the United States Patent and Trademark Office*